(12) United States Patent
Gao et al.

(10) Patent No.: US 11,780,282 B2
(45) Date of Patent: Oct. 10, 2023

(54) SUSPENSION ASSEMBLY, SUSPENSION DAMPING DEVICE AND SIX WHEELS BIONIC CHASSIS

(71) Applicants: DALU ROBOTECH, TECHNOLOGY(BEIJING) CO., LTD., Beijing (CN); SUZHOU DALU ROBOTECH TECHNOLOGY CO., LTD., Suzhou (CN)

(72) Inventors: Yuan Gao, Beijing (CN); Chang Hai Zheng, Beijing (CN)

(73) Assignees: DALU ROBOTECH, TECHNOLOGY(BEIJING) CO., LTD., Beijing (CN); SUZHOU DALU ROBOTECH TECHNOLOGY CO., LTD., Suzhou (CN)

( * ) Notice: Subject to any disclaimer, the term of this patent is extended or adjusted under 35 U.S.C. 154(b) by 115 days.

(21) Appl. No.: 17/441,589

(22) PCT Filed: Jan. 25, 2021

(86) PCT No.: PCT/CN2021/073562
§ 371 (c)(1),
(2) Date: Sep. 21, 2021

(87) PCT Pub. No.: WO2021/175042
PCT Pub. Date: Sep. 10, 2021

(65) Prior Publication Data
US 2022/0176765 A1 Jun. 9, 2022

(30) Foreign Application Priority Data

Mar. 2, 2020 (CN) .......................... 202010135427.8
Oct. 26, 2020 (CN) .......................... 202011155327.8
Oct. 26, 2020 (CN) .......................... 202022400344.5

(51) Int. Cl.
*B60G 13/00* (2006.01)
*B60G 3/20* (2006.01)
(Continued)

(52) U.S. Cl.
CPC ............. *B60G 13/003* (2013.01); *B60G 3/20* (2013.01); *B60G 11/00* (2013.01);
(Continued)

(58) Field of Classification Search
CPC .......... B60G 2400/252; B60G 2400/40; B60G 2400/823; B60G 3/06; B60G 7/008;
(Continued)

(56) References Cited

U.S. PATENT DOCUMENTS 2,753,178 A * 7/1956 Zakarian .................. B60G 3/01
267/253
2,818,273 A * 12/1957 Weihsmann ......... B60G 17/027
267/273
(Continued)

FOREIGN PATENT DOCUMENTS

CN 2673581 Y 1/2005
CN 103317987 A 9/2013
(Continued)

*Primary Examiner* — Paul N Dickson
*Assistant Examiner* — Timothy Wilhelm
(74) *Attorney, Agent, or Firm* — Muncy, Geissler, Olds & Lowe, P.C.

(57) ABSTRACT

A suspension damping device installed at a chassis of a mobile robot comprises a vehicle frame, a controlling arm set and a damping device. The vehicle frame is fixed to the chassis and arranged on the ground. One end of the controlling arm set is hinged to the vehicle frame, and the other end of the controlling arm set is hinged to a steering device, so the controlling arm set controls the motion stability of the steering device. One end of the damping device opposite to the ground is hinged to the vehicle frame, and the other end
(Continued)

of the damping device faced to the ground is hinged to the steering device. A six-wheeled bionic chassis which comprises a chassis frame, a controller, a sensor, front wheel suspension assemblies, middle wheel suspension assemblies and rear wheel suspension assemblies is also disclosed in the present invention.

17 Claims, 27 Drawing Sheets

(51) Int. Cl.
| | |
|---|---|
| B60G 11/00 | (2006.01) |
| B60G 17/019 | (2006.01) |
| B60G 17/0195 | (2006.01) |
| B60K 7/00 | (2006.01) |
| B62D 57/024 | (2006.01) |
| B62D 57/028 | (2006.01) |
| B62D 61/10 | (2006.01) |

(52) U.S. Cl.
CPC ... *B60G 17/0195* (2013.01); *B60G 17/01933* (2013.01); *B60K 7/00* (2013.01); *B62D 57/024* (2013.01); *B62D 57/028* (2013.01); *B62D 61/10* (2013.01); *B60G 2204/128* (2013.01); *B60G 2400/204* (2013.01); *B60G 2500/30* (2013.01)

(58) Field of Classification Search
CPC .. B60G 7/02; B60G 2200/44; B60G 2400/90; B60G 3/18; B60G 15/02; B60G 2200/144; B60G 2204/62; B60G 2300/07; B60G 2300/50; B60K 7/0007; B60Y 2200/20; B60Y 2200/48; B62D 63/02
See application file for complete search history.

(56) References Cited

U.S. PATENT DOCUMENTS

| | | | | | |
|---|---|---|---|---|---|
| 3,387,726 | A | * | 6/1968 | McKee | B62D 49/0607 414/458 |
| 3,499,505 | A | * | 3/1970 | De Carbon | B60G 13/06 184/26 |
| 3,804,189 | A | * | 4/1974 | Smith | B66C 19/007 180/234 |
| 3,912,289 | A | * | 10/1975 | Czajkowski, Jr. | F41A 23/56 200/188 |
| 4,241,803 | A | * | 12/1980 | Lauber | B60P 3/40 280/765.1 |
| 4,534,575 | A | * | 8/1985 | Grove | B60G 21/026 180/41 |
| 5,580,089 | A | * | 12/1996 | Kolka | B62D 9/02 280/5.521 |
| 6,036,201 | A | * | 3/2000 | Pond | B60G 15/12 280/5.514 |
| 6,311,795 | B1 | * | 11/2001 | Skotnikov | B60G 17/0152 280/6.154 |
| 6,328,120 | B1 | * | 12/2001 | Haussler | A61G 5/1051 180/8.2 |
| 6,357,770 | B1 | * | 3/2002 | Carpiaux | B60G 3/01 280/124.125 |
| 6,406,043 | B1 | * | 6/2002 | Balmer | B60B 35/1054 301/128 |
| 6,899,191 | B1 | * | 5/2005 | Lykken | B62M 27/02 180/186 |
| 7,793,971 | B2 | * | 9/2010 | Sakashita | F16F 9/54 188/322.19 |
| 7,900,942 | B2 | * | 3/2011 | Koschinat | B60G 7/001 280/124.128 |
| 8,322,500 | B2 | * | 12/2012 | Obrecht | F16F 9/54 280/492 |
| 8,376,077 | B2 | * | 2/2013 | Venton-Walters | B62D 49/0678 180/209 |
| 8,376,078 | B2 | * | 2/2013 | Hiddema | B60B 35/001 180/209 |
| 8,424,881 | B2 | * | 4/2013 | Vander Zaag | B60G 3/01 280/43.17 |
| 8,602,137 | B2 | * | 12/2013 | Kroese | B60G 11/28 180/41 |
| 8,800,734 | B2 | * | 8/2014 | Handke | B60G 13/005 188/322.19 |
| 8,839,891 | B2 | * | 9/2014 | Kaloust | B62D 61/10 180/6.48 |
| 8,985,610 | B2 | * | 3/2015 | Juan | B60G 3/185 280/285 |
| 9,278,594 | B2 | * | 3/2016 | Horsch | B62D 7/06 |
| 11,130,519 | B1 | * | 9/2021 | Cui | B62D 63/02 |
| 11,260,922 | B2 | * | 3/2022 | Ishikawa | B60G 3/20 |
| 11,420,491 | B2 | * | 8/2022 | Sirault | B62D 49/0607 |
| 11,524,735 | B2 | * | 12/2022 | Ishikawa | B62D 61/10 |
| 2002/0190494 | A1 | * | 12/2002 | Cocco | B62D 9/02 280/124.135 |

FOREIGN PATENT DOCUMENTS

| | | |
|---|---|---|
| CN | 108099523 A | 6/2018 |
| CN | 207644108 U | 7/2018 |
| CN | 109176461 A | 1/2019 |
| CN | 109353407 A | 2/2019 |
| CN | 110341793 A | 10/2019 |
| CN | 110481670 A | 11/2019 |
| CN | 111137084 A | 5/2020 |
| CN | 211663015 U | 10/2020 |
| JP | 2014168971 A | 9/2014 |
| KR | 20080054752 A | 6/2008 |

* cited by examiner

SUSPENSION ASSEMBLY, SUSPENSION DAMPING DEVICE AND SIX WHEELS BIONIC CHASSIS

FIELD OF THE INVENTION

The present invention relates to chassis machinery technical field, more particularly, a suspension device, a suspension damping device and a six-wheels bionic chassis applying on robots, mobile robots or mobile vehicles. The suspension device and the suspension damping device are used to increase the obstacle-crossing capabilities of the robots, mobile robots or the mobile vehicles.

BACKGROUND OF THE INVENTION

In the relate art, an important mechanism in the mobile robot is a suspension damping device. The suspension damping device can decrease oscillations occurred during a movement of the mobile robot, so the mobile robot can work stably. The conventional suspension damping device uses a linear-bearing suspension system. However, the structure of the linear-bearing suspension system is not compact, the dedicated space of the linear-bearing suspension system is large, and the cost of the linear-bearing suspension system is expensive, too. Moreover, when the linear-bearing suspension system is installed at the suspension damping device, a higher processing accuracy is needed on an installing surface. Thus, the life span of the whole suspension damping device is decreased, and the cost is also expensive.

Furthermore, the vehicle engineering is progressing with the rapid development of technology. A general mobile vehicle is divided into two parts: vehicle body and wheeled chassis. A common wheeled chassis includes at least wheels, a vehicle frame, a steering device (or turning device), a motive supplying device, a brake and a suspension device. Therein, the wheels, the steering device and the suspension system are the most important assemblies to control a moving direction and avoid rollover of the mobile vehicle. The general mobile vehicle will encounter some problems such as turning or obstacles crossing. Therefore, how to keep stable when the mobile vehicle is moving forward and keep smooth when the mobile vehicle is turning are the topics which is keeping studying for vehicle engineering.

With reference to the turning topic, the wheels and the steering device are core subjects when the mobile vehicle is controlled to turn. The conventional steering device is a single-linkage type steering device, which is characterized in that: the driver can control the tires of the front wheels individually and directly. For example, in a four wheels mobile vehicle, there are two steering devices used to control the two front wheels. When the mobile vehicle wants to turn, the driver will rotate the steering wheel to control the wheels to a predetermined direction that the mobile vehicle wants to turn, the front wheels controlled by the steering device will turn to the predetermined direction, and the rear wheels will be associated to turn to the predetermined direction and move forward. This type of the steering device is enough for the general four-wheels mobile vehicle, however, the single-linkage type steering device can not apply to some special mobile vehicles which have a plurality of wheels, such as a bus or a tank which has many wheels and belts.

On the other hand, the suspension device of the mobile vehicle is used to stabilize the mobile vehicle, so the mobile vehicle can keep stability in a plurality of moving situations, such as moving on a horizontal plane, climbing along an incline or crossing an obstacle. The suspension device is composed of a spring and a damping cylinder, so the suspension device is viewed as a damping device. For mobile vehicles that the general people use, the suspension device can be an individual suspension device or a non-individual suspension device, in which the individual suspension device is characterized in that the left part and the right part of the wheels are controlled separately, and the non-individual suspension device is characterized in that all wheels of the mobile vehicle are integrally controlled. The suspension devices can be further divided into an active type or a passive type. The deference between the two type suspension devices is that the active suspension device can compute to accommodate different road environments according to elasticity constant and damping coefficient of the suspension devices, and elasticity constant and damping coefficient of the passive suspension device are both fixed, which is not changed due to different environments.

In recent years, robots are applied on the wheeled chassis of the mobile vehicle. The general robots are usually used at outdoors, the environment with rough ground or a disaster scene, so the wheeled chassis used on the robots need better topographic adaptability and mobility than the wheeled chassis used on the mobile vehicle. Thus, there is still a long way to go for improving the technology when applying the wheeled chassis used on the mobile vehicle on the robots. A conventional mobile vehicle which has a slipknot type suspension device and using method of the slipknot type suspension device thereof is disclosed, in which the disclosed chassis device is used to military mobile vehicles, i.e., the environment with rough ground, and the chassis device has good topographic adaptability, obstacle crossing ability and tires which have good mobility. Nonetheless, the conventional chassis device of the related art cannot drive the robot to climb stairs, turn to different directions or have random moving directions, and the mobility device which the conventional chassis device connected is not disclosed, such as a robot moving device or only has a vehicle body. It is to say that the effect of changing the moving device for operating the chassis is not considered.

SUMMARY OF THE INVENTION

It is an object of the present invention is to provide a suspension damping device, when the suspension damping device is acting, the wheel set can be driven to move up and down, and can maintain the wheel set in contact to the ground or a road surface, so a chassis installed with the suspension damping device can cross obstacles smoothly.

According to the above objective, the present invention discloses a suspension damping device installed at a chassis of a mobile robot. The suspension damping device includes a vehicle frame, a controlling arm set, a spring damping device and a steering device. The vehicle frame is arranged at the ground and fixed to the chassis. The controlling arm set includes an upper supporting arm and a lower supporting arm, one ends of the upper controlling arm and the lower controlling arm are respectively hinged to the vehicle frame, and the other ends of the upper controlling arm and the lower controlling arm are respectively hinged to the steering device, so the controlling arm set controls the motion stability of the steering device. One end of the damping device opposite to the ground is hinged to the vehicle frame, and the other end of the damping device faced to the ground that is hinged to the steering device.

The present invention further discloses a suspension damping device installed at a chassis of a mobile robot. The suspension damping device includes a vehicle frame, a controlling arm set, a suspension damping device and a steering device. The vehicle frame is arranged on the ground and fixed to the chassis. The controlling arm set includes an upper controlling arm and a lower controlling arm, one ends of the of the upper controlling arm and the lower controlling arm are respectively hinged to the chassis, and the other ends of the upper controlling arm and the lower controlling arm are respectively hinged to the steering device, so the controlling arm set controls the motion stability of the steering device. The damping device is perpendicular to the ground, one end of the damping device opposite to the ground is hinged to the chassis, and the other end of the damping device faced to the ground is hinged to the lower controlling arm.

The present invention still further discloses a suspension damping device installed at a chassis of a mobile robot. The suspension damping device includes a vehicle frame, a wheel set hinged seat, a damping device and a steering device. The vehicle frame is arranged on the ground and fixed to the chassis, one end of the wheel set hinged seat is hinged to the vehicle frame and the other end of the wheel set hinged seat is fixed to the steering device, so the wheel set hinged seat controls the motion stability of the steering device. The damping device is arranged on the vehicle frame, one end of the damping device opposite to the ground is hinged to the vehicle frame, the other end of the damping device faced to the ground is arranged on the wheel set hinged seat, and the other end of the damping device is hinged to the wheel set hinged seat.

In addition, the present invention further discloses a suspension assembly. The suspension assembly can be applied to a robot or a mobile vehicle, so the robot or the mobile vehicle can move on a scraggly surface of the horizontal plane such as an unpaved road or a dirt road to smoothly cross over a deceleration zone or a vertical obstacle.

The suspension assembly disclosed by the present invention can adjust toughness of the suspension assembly to compress a height of a wheel set, so the robot or the mobile vehicle has a damping stroke corresponding to the positive and negative range the compression height.

According to the above, the present invention discloses a suspension assembly, includes: a supporting arm set is composed by a first supporting arm and a second supporting arm; a suspension spring assembly is arranged between the first supporting arm and the second supporting arm, and two ends of the suspension spring assembly are respectively hinged to two end of the first supporting arm and the second supporting arm; and a steering supporting frame, one end of the steering supporting frame is hinged to one ends of the first supporting arm and the second supporting arm, the other end of the steering supporting frame is hinged to a steering mechanism, and one end of the steering mechanism faced to the horizontal plane is pivotally connected to a wheel set.

It is another objective of the present invention is to disclose a six-wheel bionic chassis. The front wheel suspension spring assembly, a middle wheel suspension spring assembly and a rear wheel suspension spring assembly of the six-wheel bionic chassis can drive the wheel set to move up and down, and can maintain front wheel set, middle wheel set and rear wheel set in contact to the horizontal plane to maintain the balance of the six-wheel bionic chassis.

It is another objective of the present invention is to disclose a six-wheel bionic chassis, the entire structure of the six-wheel bionic chassis is compact, and the load capacity of the six-wheel bionic chassis can be adjusted by adjusting the front wheel suspension spring assembly, the middle wheel suspension spring assembly and the rear wheel suspension spring assembly.

It is still another objective of the present invention is to disclose a six-wheel bionic chassis that can adjust the toughness of front wheel suspension assembly, middle wheel suspension assembly and rear wheel suspension assembly to compress heights of front wheel set, middle wheel set and rear wheel set, so the entire six-wheel bionic chassis has a damping stroke corresponding to the positive and negative range of the compression height.

According to the above objectives, the present invention discloses a six-wheel bionic chassis that includes a chassis frame, a controller, a sensor, and front wheel suspension assemblies are pivotally connected to both sides of a front end of the chassis frame toward the horizontal plane, middle wheel suspension assemblies are pivotally connected to middle two sides of the chassis frame, and rear wheel suspension assemblies are pivotally connected to both sides of a rear end of the chassis frame, and the controller and the sensor are electrically connected to the front wheel suspension assemblies, the middle suspension assemblies and the rear wheel suspension assemblies respectively. Each of the front wheel suspension assemblies includes: a front wheel auxiliary wheel-lifting supporting frame, one end of the front wheel auxiliary wheel-lifting supporting frame is hinged to the front end of the chassis frame; a front wheel upper supporting arm set composed by a by a first front wheel upper supporting arm and a pair of second front wheel upper supporting arms, the first front wheel upper supporting arm is arranged above the pair of second front wheel upper supporting anus, one end of the first front wheel upper supporting arm is hinged to the other end of the front wheel auxiliary wheel-lifting supporting frame and the other end of the first front wheel upper supporting arm is hinged to a front wheel steering supporting frame, one end of each of the second front wheel upper supporting anus is hinged to the other end of the front wheel auxiliary wheel-lifting supporting frame and the other end of each of the second front wheel upper supporting arms is hinged to the front wheel steering supporting frame; both ends of a front wheel suspension spring assembly are hinged to the both ends of the front wheel upper supporting arm set; and one end of the front wheel steering supporting frame is fixedly connected to a front wheel steering mechanism, one end of the front wheel steering mechanism faced to a ground direction is pivotally connected to a front wheel set, the front wheel set is pivotally connected to a front wheel hub motor, so the front wheel upper supporting arm set, the front wheel auxiliary wheel-lifting supporting frame and the front wheel steering supporting frame of the front steering assembly constitute a front wheel linkage mechanism to control a movement trajectory of the front wheel set when the front wheel set encounters a vertical obstacle.

Each of the middle wheel suspension assemblies comprises: a middle wheel upper supporting arm set composed by a first middle wheel upper supporting arm and a pair of second middle upper supporting arms, the first middle upper supporting arm is arranged above the pair of second middle wheel upper supporting arm, one end of the middle wheel upper supporting arm is hinged to the middle of the chassis frame, the other end of the first middle wheel upper supporting arm is hinged to a middle wheel steering supporting frame, one end of each of the second middle wheel upper supporting arms is hinged to the middle of the chassis frame respectively, and the other end of each of the second middle upper supporting arms is hinged to a middle wheel steering supporting frame respectively; a middle wheel suspension spring assembly, where both ends of the middle wheel suspension spring assembly are hinged to the two ends of the middle wheel upper supporting arm set respectively; and the middle wheel steering supporting frame, one end of the middle wheel steering supporting frame is fixedly connected to a middle wheel steering mechanism and the other end faced to a ground direction of the middle wheel steering mechanism is pivotally connected to a middle wheel set, the middle wheel set is pivotally connected to a middle wheel hub motor, so the middle wheel upper supporting arm set and the middle wheel steering supporting frame of the middle wheel steering assembly constitute a middle wheel linkage mechanism to control a movement trajectory of the middle wheel set when the middle wheel set encounters a vertical obstacle.

Each of the rear wheel suspension assemblies comprises: a rear wheel upper supporting arm set composed by a first rear wheel upper supporting arm and a pair of second rear wheel upper supporting arms, the first rear wheel upper supporting arm is arranged above the pair of second rear wheel upper supporting arm, one end of the first rear wheel upper supporting arm is hinged to a rear end of the chassis frame, the other end of the first rear wheel upper supporting arm is hinged to a rear wheel steering supporting frame, one ends of each of the second rear wheel upper supporting arms is hinged to the rear end of the chassis frame respectively, and the other ends of each of the second rear wheel upper supporting arms is hinged to the rear wheel steering supporting frame respectively; a rear wheel suspension spring assembly, where both ends of the rear wheel suspension spring assembly are hinged to the rear wheel upper supporting arm respectively; and the rear wheel steering supporting frame, one end of the rear wheel steering supporting frame is fixedly connected to a rear wheel steering mechanism and one end faced to a horizontal plane direction of the rear wheel steering mechanism is pivotally connected to a rear wheel set, and the rear wheel set is pivotally connected to a rear wheel hub motor, so the rear wheel upper supporting arm set and the rear wheel steering supporting frame of the rear wheel steering assembly constitute a rear wheel linkage mechanism to control a movement trajectory of the rear wheel set when the rear wheel set encounters a vertical obstacle.

The present invention further discloses a six-wheel bionic chassis comprising a chassis frame, a controller, a sensor, and front wheel suspension assemblies are pivotally connected to both sides of a front end of the chassis frame, middle wheel suspension assemblies are pivotally connected to middle two sides of the chassis frame, and rear wheel suspension assemblies are pivotally connected to both sides of a rear end of the chassis frame, the controller and the sensor are electrically connected to the front wheel suspension assemblies, the middle wheel suspension assemblies and the rear wheel suspension assemblies. Each of the front wheel suspension assemblies includes: a front wheel suspension fixing seat is fixedly connected to the front end of the chassis frame; a front wheel auxiliary wheel-lifting supporting frame, one end of the front wheel auxiliary wheel-lifting supporting frame is hinged to the front wheel suspension fixing seat; a front wheel auxiliary wheel-lifting spring assembly, one end of the front wheel auxiliary wheel-lifting spring assembly is hinged to the other end of the front wheel auxiliary wheel-lifting supporting frame and the other end of the front wheel auxiliary wheel-lifting spring assembly is hinged to the front wheel suspension fixing seat; a front wheel upper supporting arm set composed by a front wheel upper supporting arm and a pair of second supporting arms, the first front wheel upper supporting arm is arranged above the pair of second front wheel upper supporting arms, one end of the first front wheel upper supporting arm is hinged to the other end of the front wheel auxiliary wheel-lifting supporting frame and the other end of the first front wheel upper supporting arm is hinged to a front wheel steering supporting frame, one ends of each of the second front wheel upper supporting arms is hinged to the other end of the front wheel auxiliary wheel-lifting supporting frame and the other ends of each of the second front wheel upper supporting arms is hinged to the front wheel steering supporting frame; both ends of a front wheel suspension spring assembly are hinged to both ends of the front wheel upper supporting arm set respectively; and the front wheel steering supporting frame, one end of the front wheel steering supporting frame is fixedly connected to a front wheel steering mechanism, one end of the front wheel steering mechanism faced to a ground direction is pivotally connected to a front wheel set, and the front wheel set is pivotally connected to a front wheel hub motor, so the front wheel upper supporting arm set, the front wheel auxiliary wheel-lifting supporting frame and the front wheel steering supporting frame of the front steering assembly constitute a front wheel linkage mechanism to control a movement trajectory of the front wheel set when the front wheel set encounters a vertical obstacle.

Each of the middle wheel suspension assemblies includes: a middle wheel suspension fixing seat is fixedly connected to the chassis frame; a middle wheel upper supporting arm set composed by a first middle wheel upper supporting arm and a pair of second middle upper supporting arms, the first middle upper supporting arm is arranged above the pair of second middle wheel upper supporting arm, one end of the middle wheel upper supporting arm is hinged to the other end of the middle wheel suspension fixing seat, the other end of the first middle upper supporting arm is hinged to a middle wheel steering supporting frame, one ends of each of the second upper supporting arms is hinged to the other end of the middle wheel suspension fixing seat, and the other ends of each of the second middle wheel upper supporting arms is hinged to a middle wheel steering supporting frame respectively; a middle wheel suspension spring assembly, both ends of the middle wheel suspension spring assembly are hinged to the middle wheel upper supporting arm set respectively; and the middle wheel steering supporting frame, one end of the middle wheel steering supporting frame is fixedly connected to a middle wheel steering mechanism, one end faced to a ground direction of the middle wheel steering mechanism is pivotally connected to a middle wheel set, and the middle wheel set is pivotally connected to a middle wheel hub motor, so the middle wheel upper supporting arm set and the middle wheel steering supporting frame of the middle wheel steering assembly constitute a middle wheel linkage mechanism to control a movement trajectory of the middle wheel set when the middle wheel set encounters a vertical obstacle.

Each of the rear wheel suspension assemblies includes: a rear wheel suspension fixing seat fixed to the rear end of the chassis frame; a rear wheel upper supporting arm set composed by a first rear wheel upper supporting arm and a set of second rear wheel upper supporting arms, the first rear wheel upper supporting arm is arranged above the pair of second rear wheel upper supporting arm, one end of the first rear wheel upper supporting arm is hinged to the other end of the rear wheel suspension fixing seat, and the other end of the first rear wheel upper supporting arm is hinged to a rear wheel steering supporting frame, one ends of each of the second rear wheel supporting arms is hinged to the other end of the rear wheel suspension fixing seat and the other ends of each of the second rear wheel upper supporting arms is hinged to the rear wheel steering supporting frame respectively; a rear wheel suspension spring assembly, two ends of the rear wheel suspension spring assembly are hinged to the two ends of the rear wheel upper supporting arm set respectively; and the rear wheel steering supporting frame, one end of the rear wheel steering supporting frame is fixedly connected to a rear wheel steering mechanism, one end faced to a ground direction of the rear wheel steering mechanism is pivotally connected to a rear wheel set, and the rear wheel set is pivotally connected to a rear wheel hub motor. So the rear wheel upper supporting arm set and the rear wheel steering supporting frame of the rear wheel steering assembly constitute a rear wheel linkage mechanism to control a movement trajectory of the rear wheel set when the rear wheel set encounters a vertical obstacle.

DETAILED DESCRIPTION OF THE PREFERRED EMBODIMENT

Figure 1:
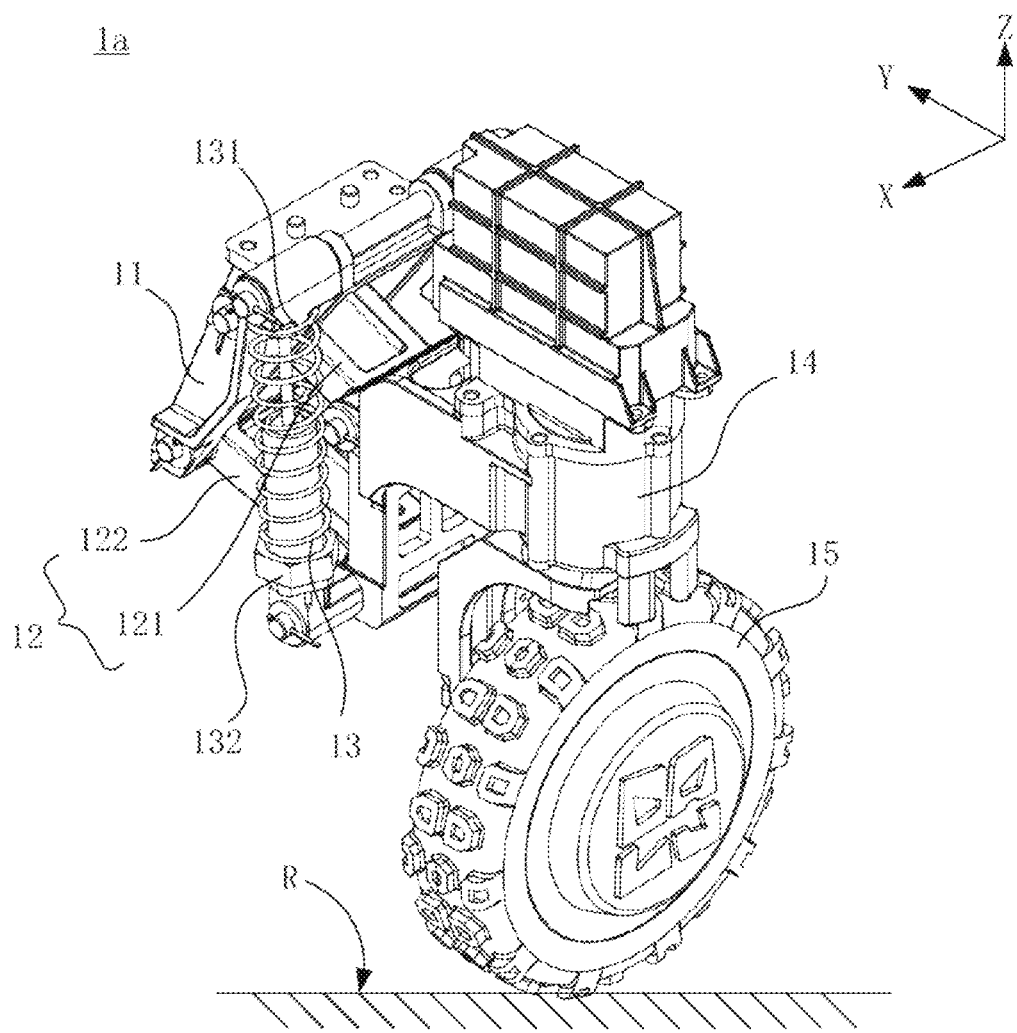
FIG. 1 is a perspective schematic view of a suspension damping device in accordance with the present invention.
Figure 2:
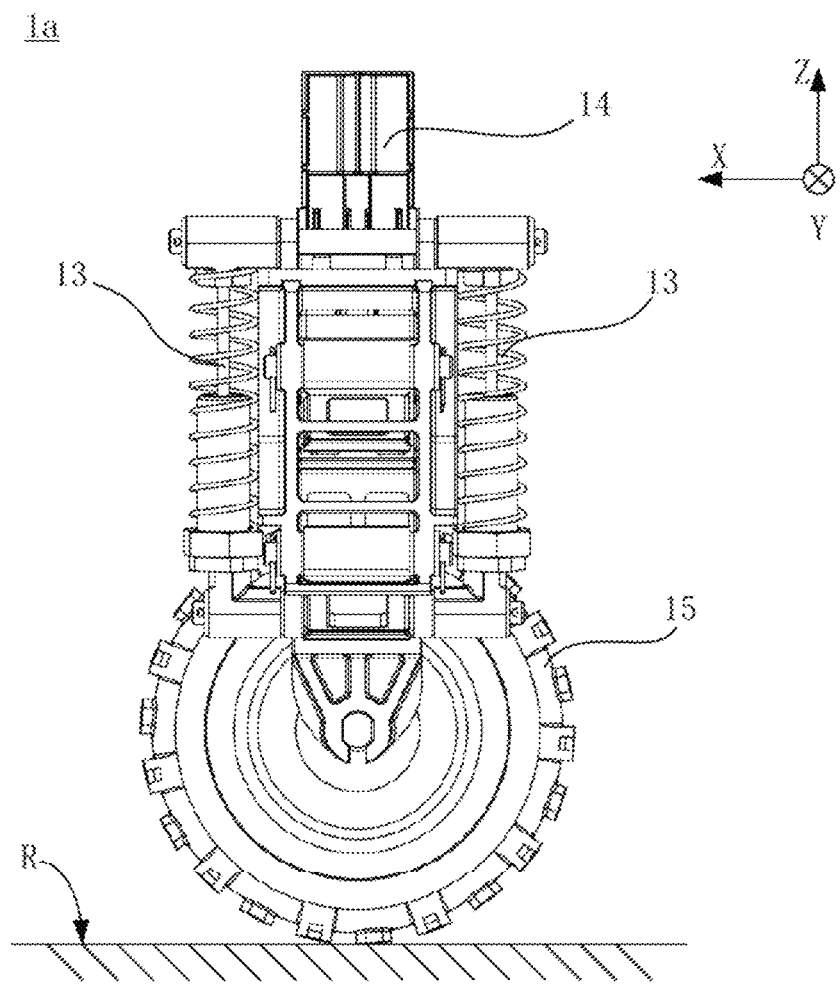
FIG. 2 is a side view of the suspension damping device in accordance with the present invention.

First, please refer to FIG. 1 and FIG. 2 together. FIG. 1 is a perspective schematic view of a suspension damping assembly and FIG. 2 is a side view of the suspension damping assembly. In FIG. 1 and FIG. 2, the suspension damping device 1a includes a vehicle frame 11, a controlling arm set 12, a damping device 13 and a steering device 14, in which the vehicle frame 11 is arranged on the ground R and is fixed at a chassis of a mobile robot (not shown). The controlling arm set 12 is composed of an upper first supporting arm 121 and a lower supporting arm 122, in which one ends of the upper supporting arm 121 and the lower supporting arm 122 are hinged to the vehicle frame 11, and the other ends of the upper supporting arm 121 and the lower supporting arm 122 are hinged to the steering device 14. An appropriate distance is between the upper supporting arm 121 and the lower supporting arm 122, so the appropriate distance will not cause that the upper supporting arm 121 is interfered with the lower supporting arm 122 during operation. In addition, two ends of the upper supporting arm 121 and the lower supporting arm 122 are hinged to the vehicle frame 11 and the steering device 14 respectively, so the controlling arm set 12 can control a motion stability of the steering device 14. It should also be added that the horizontal plane R can be a road surface or the ground in this embodiment.

Furthermore, one end 131 of the damping device 13 opposite to the horizontal plane R is hinged to the vehicle frame 11, and the other end 132 of the damping device 13 faced to the ground R is hinged to the steering device 14. In this embodiment, the damping device 13 achieves damping effect through a steel spring (not shown), however, the damping device 13 can also achieve the similar damping effect through other materials such as rubber, polyurethane, air damping or other materials.

Figure 3:
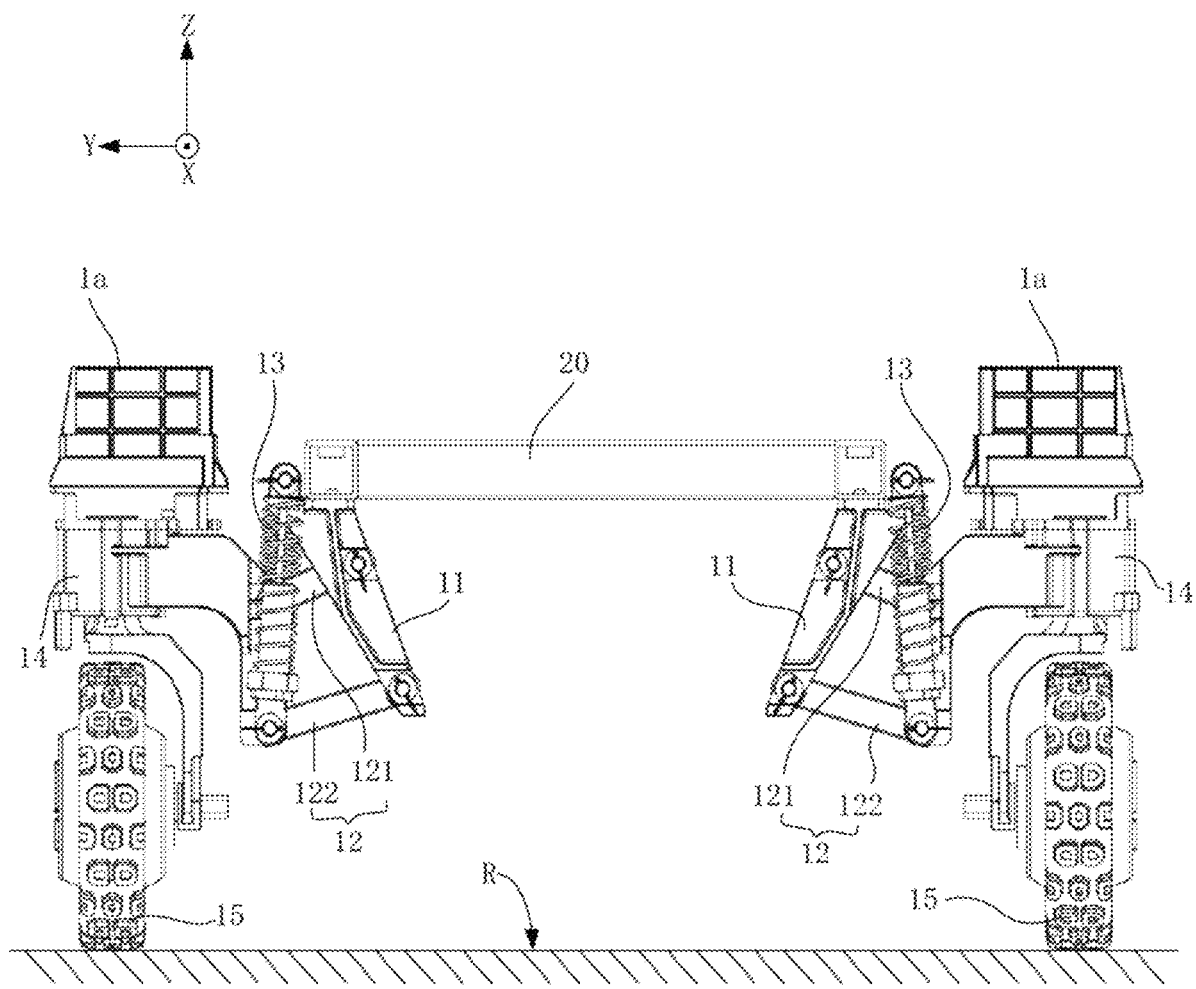
FIG. 3 is a side view of the suspension damping device installed at the chassis of the mobile robot in accordance with the present invention.
Figure 4:
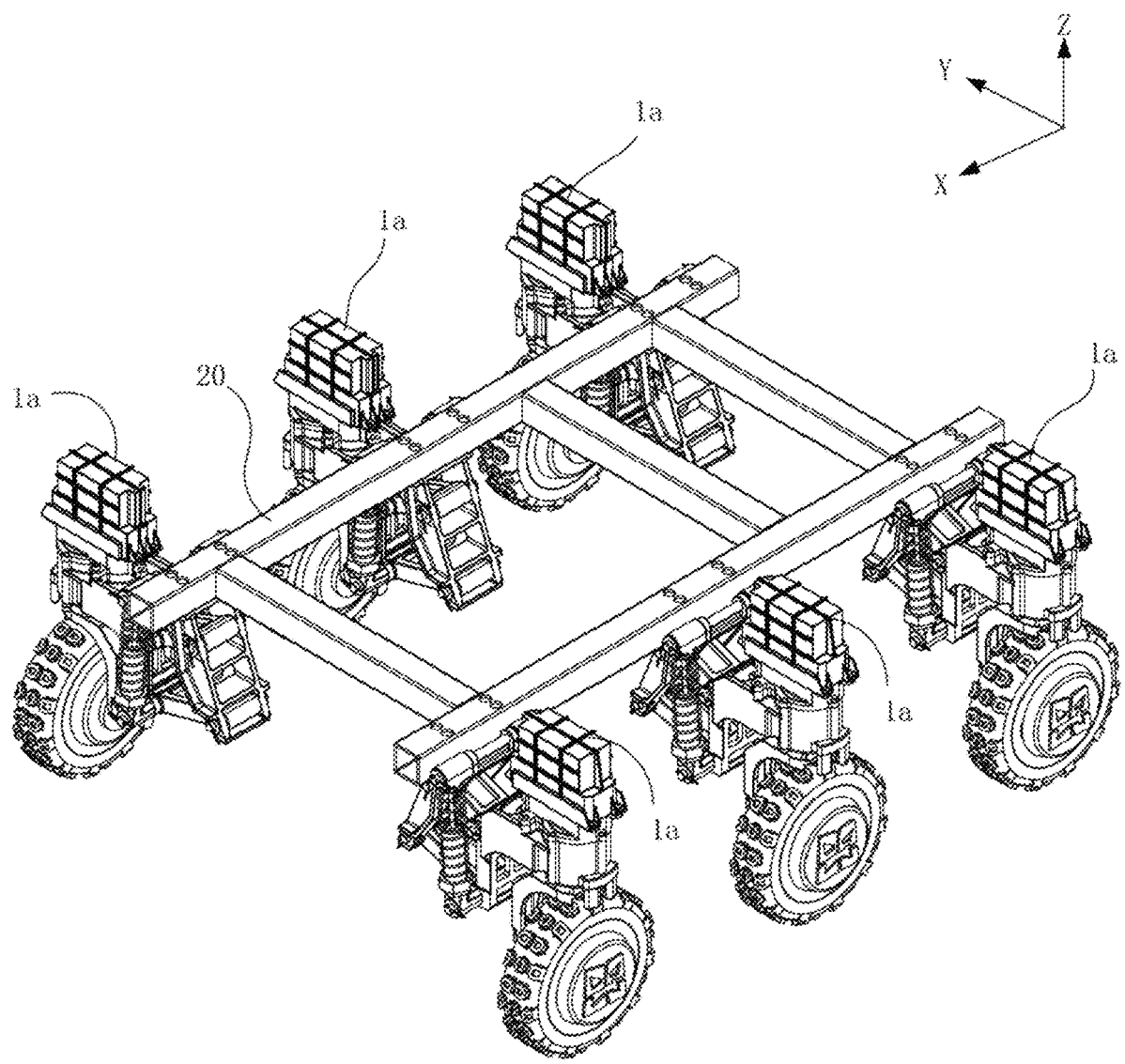
FIG. 4 is a perspective schematic view of the suspension damping device installed at the chassis of the mobile robot in accordance with the present invention.

Please refer to FIG. 3 and FIG. 4. FIG. 3 is a side view of the suspension damping device installed at a chassis of a mobile robot, and FIG. 4 is a perspective schematic view of the suspension damping device installed at the chassis. In this embodiment, the vehicle frame 11 is fixed at the chassis 20, in which the vehicle frame 11 is fixed at the chassis 20 through screws (not shown) to bear a robot (not shown) or a mobile vehicle (not shown) thereon. In addition, the suspension damping device 10 further includes a wheel set 15, the wheel set 15 is arranged at the steering device 14 to face toward to and contact to the horizontal plane R. The wheel set 15 changes a moving direction of the whole mobile robot according to the manipulation of the steering device 14.

In this embodiment, when the mobile robot installed with the suspension damping device 1a moves on the uneven road surface R, the wheel set 15 encounters an obstacle such as a rock or a cavity during the movement. The damping device 13 of the suspension damping device 10 will drive the wheel set 15 to move up and down during crossing the obstacle. The damping device 13 can maintain the wheel set 15 in contact to the road surface R at any time in addition to maintain the balance of the entire mobile robot during the movement of the mobile robot. At the same time, the damping device 13 can also drive the wheel set 15 to move up and down to reduce the oscillation when the mobile robot crosses the obstacle, so that the mobile robot can cross the road surface R smoothly. In a preferred embodiment of the present invention, at least 6 sets of the suspension damping devices 1a are installed at the chassis 20, and the number of the wheel sets 15 is corresponding to the that of the suspension damping devices 1a. In addition, the number of the damping device 13 of the suspension damping device 1a can be two, and the two damping devices 13 are respectively arranged on both sides of the controlling arm sets (as shown in FIG. 2). When the suspension damping device 1a encounters the obstacle, the damping devices 13 at both side of the controlling arm set 12 can improve the damping accuracy and further optimize the damping effect. Each of the damping device 13 can also selectively replaced with the elastic assemblies, so as to loosening or tightening the elastic assemblies to modify the load-bearing capacity of the chassis 20.

Figure 5:
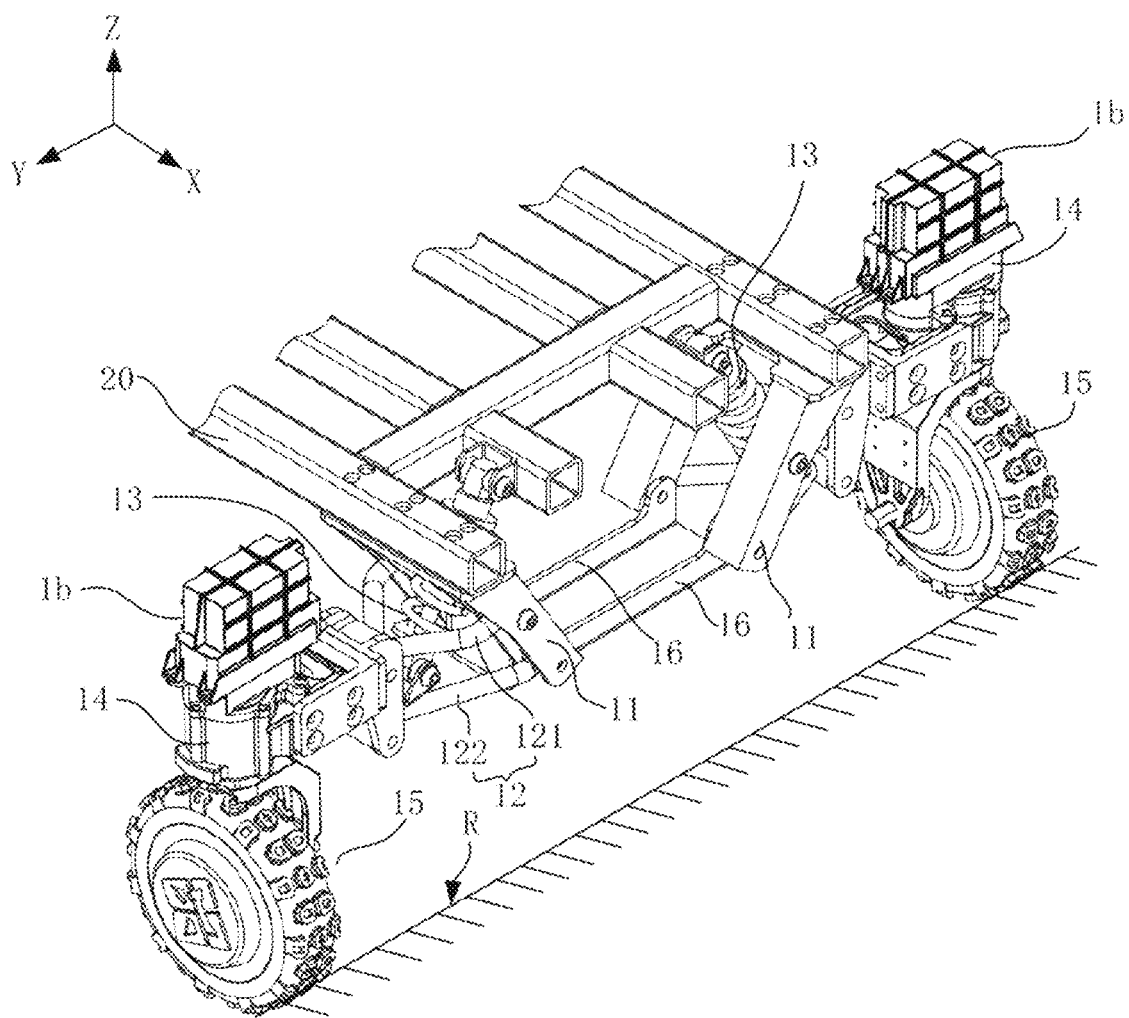
FIG. 5 is a perspective schematic view of the suspension damping device in accordance with the present invention.
Figure 6:
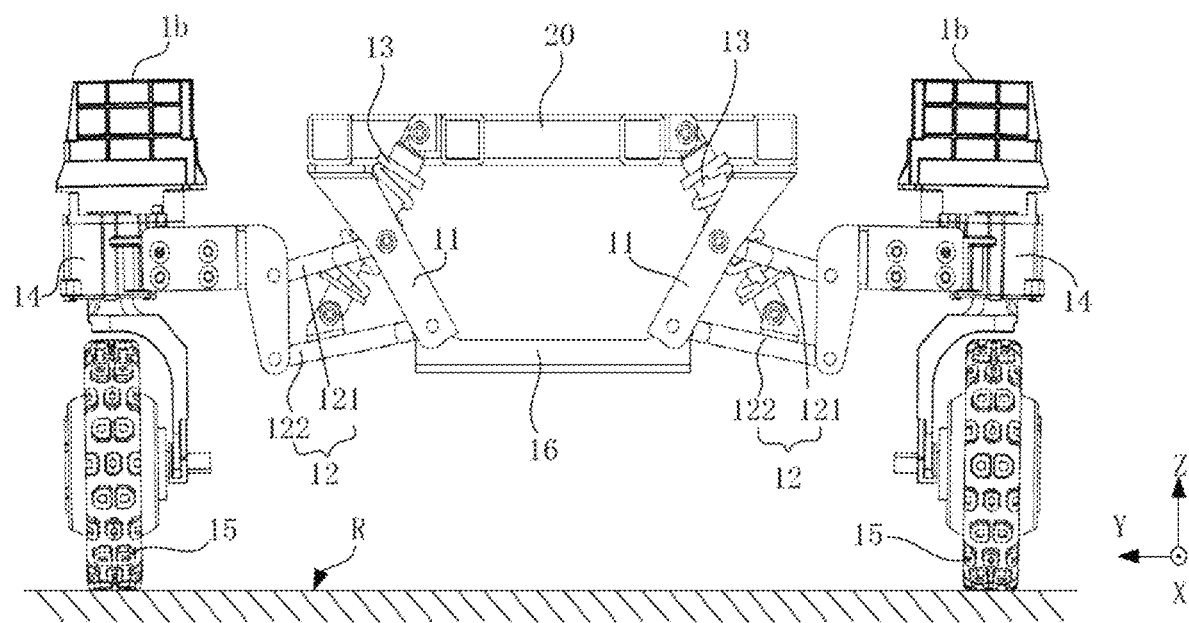
FIG. 6 is a side view of the suspension damping device in accordance with the present invention.
Figure 7:
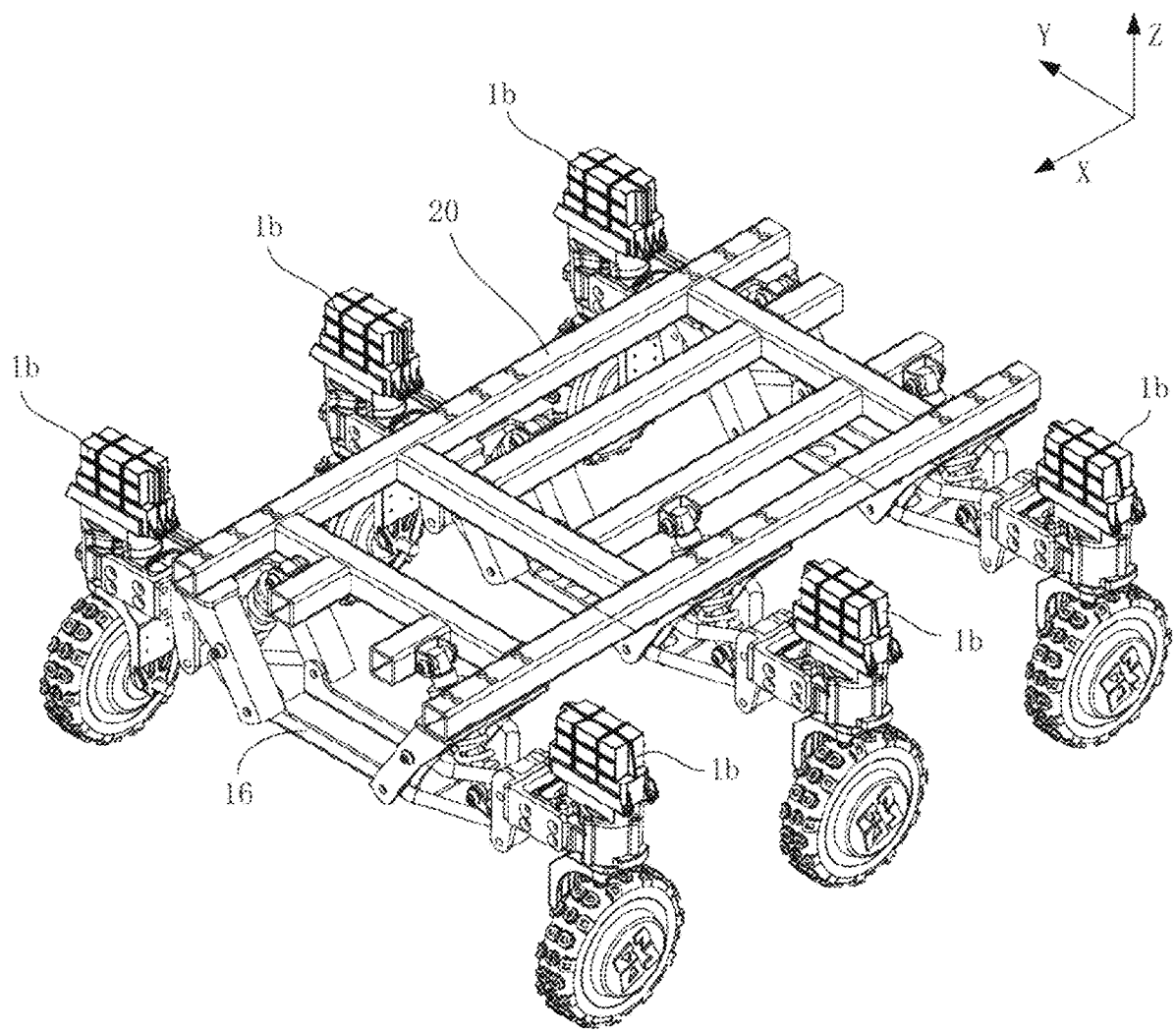
FIG. 7 is a perspective schematic view of the suspension damping device installed at the chassis of the mobile robot in accordance with the present invention.

Please refer FIG. 5 to FIG. 7. FIG. 5 is a perspective schematic view of a suspension damping device in accordance with the present invention, FIG. 6 is a side view of the suspension damping device, and FIG. 7 is a perspective schematic view of the suspension damping device installed at a chassis of a mobile robot. The suspension damping device 1b in this embodiment is similar to the aforementioned suspension damping device 1a, so the same components are denoted by the same reference numerals, and will not be repeated herein. The difference between the suspension damping device 1b and the suspension damping device 1a is that one end of the damping device 13 relative to the road surface R is hinged to the chassis 20, and the other end of the damping device 13 facing the road surface R is hinged to the lower controlling arm 122.

Besides, in a preferred embodiment of the present invention, a vehicle frame hinged bracket 16 is parallel to the ground R and perpendicular to the steering device 14, and two ends of each the vehicle frame hinged brackets 16 are respectively hinged to vehicle frame 11 in two opposite suspension damping devices 1b. Accordingly, the two opposite suspension damping devices 1b and the chassis 20 are linked to form a closed frame, so as to improve the fixing strength of the suspension damping device 1b. When a loading weight on the chassis 20 is increased, the closed frame constructed by the suspension damping devices 1b and the chassis 20 can reduce the amount of deformations of the suspension damping device 1b in +y or −y directions during the movement of the chassis 20.

Figure 8:
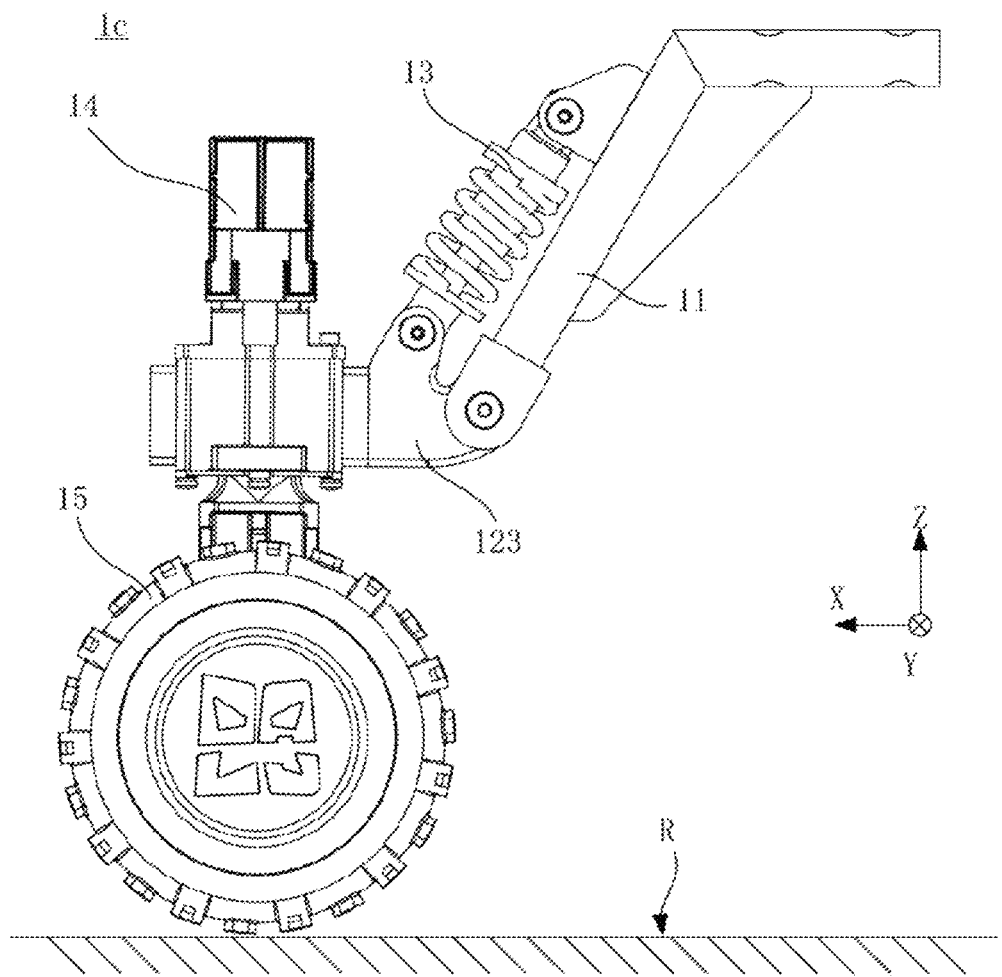
FIG. 8 is a side view of a suspension damping device in accordance with the present invention.
Figure 9:
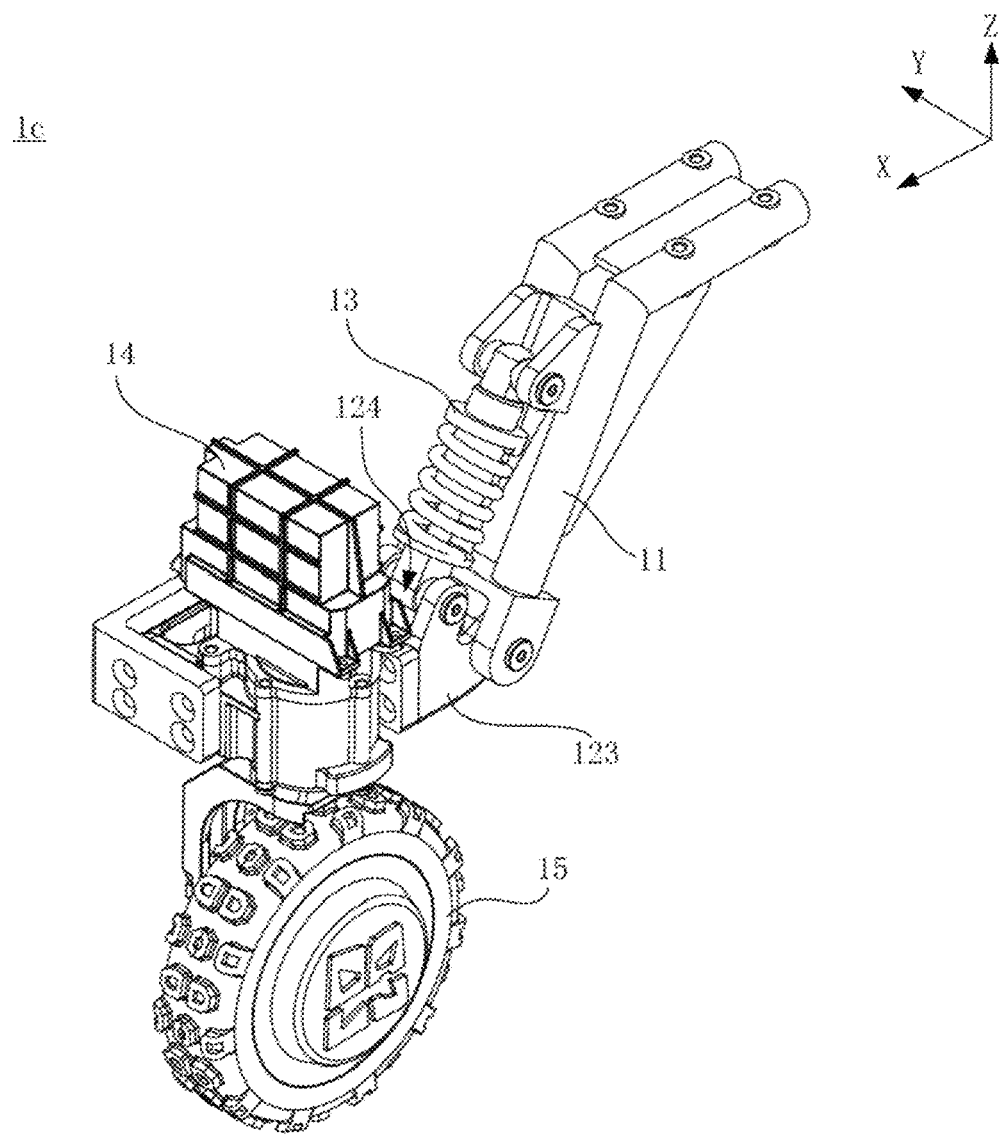
FIG. 9 is a perspective schematic view of the suspension damping device in accordance with the present invention.
Figure 10:
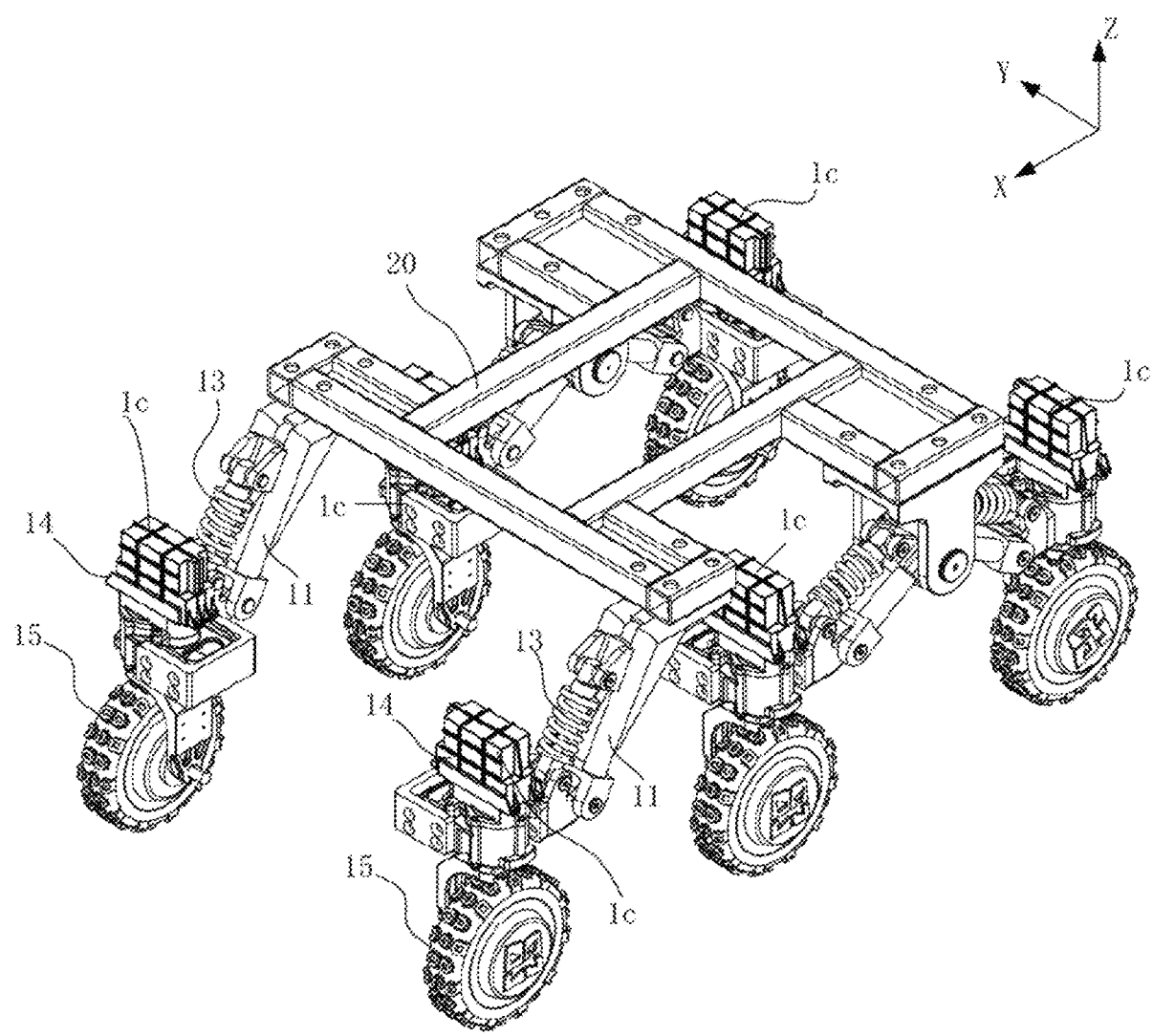
FIG. 10 is a perspective schematic view of the suspension damping device installed at a chassis of a mobile robot in accordance with the present invention.

Next, please refer to FIG. 8 to FIG. 10. FIG. 8 is a side view of a suspension damping device in another embodiment disclosed by the present invention, FIG. 9 is a perspective schematic view of the suspension damping device in another embodiment disclosed by the present invention, and FIG. 10 is a perspective schematic view of the suspension damping device installed at a chassis of a mobile robot disclosed by the present invention. In FIG. 8 to FIG. 10, the difference between a suspension damping device 1c and the suspension damping devices 1a and 1b is that the suspension damping device 1c includes a wheel set hinged seat 123, one end of the wheel set hinged seat 123 is hinged to the vehicle frame 11 and the other end of the wheel set hinged seat 123 is hinged to the steering device 14. As shown in FIG. 9, the wheel set hinged seat 123 includes a recess 124 (as an arrow shown in FIG. 9), the recess 124 is provided for accommodating the damping device 13, where one end of the damping device 13 is hinged to the vehicle frame 11 and the other end faced to the road surface R is hinged to the recess 124. Accordingly, the vehicle frame 11, the wheel set hinged seat 123 and the damping device 13 form a triangle, and the suspension damping device 1c can control a motion stability of the steering device 14 through the wheel set hinged seat 123.

According to the above, the two ends of the damping device 13 of the suspension damping devices 1a, 1b, and 1c are respectively hinged to the vehicle frame 11 and the steering device 14. When the suspension damping device 13 acts, the suspension damping device 13 can drive the wheel set 15 to move up and down and can maintain the wheel set 15 in contact to the road surface R at a front angle to maintain the balance of the running chassis 20, so that the chassis 20 equipped with the suspension damping devices 1a, 1b and 1c can smoothly cross the obstacles.

Figure 11A:
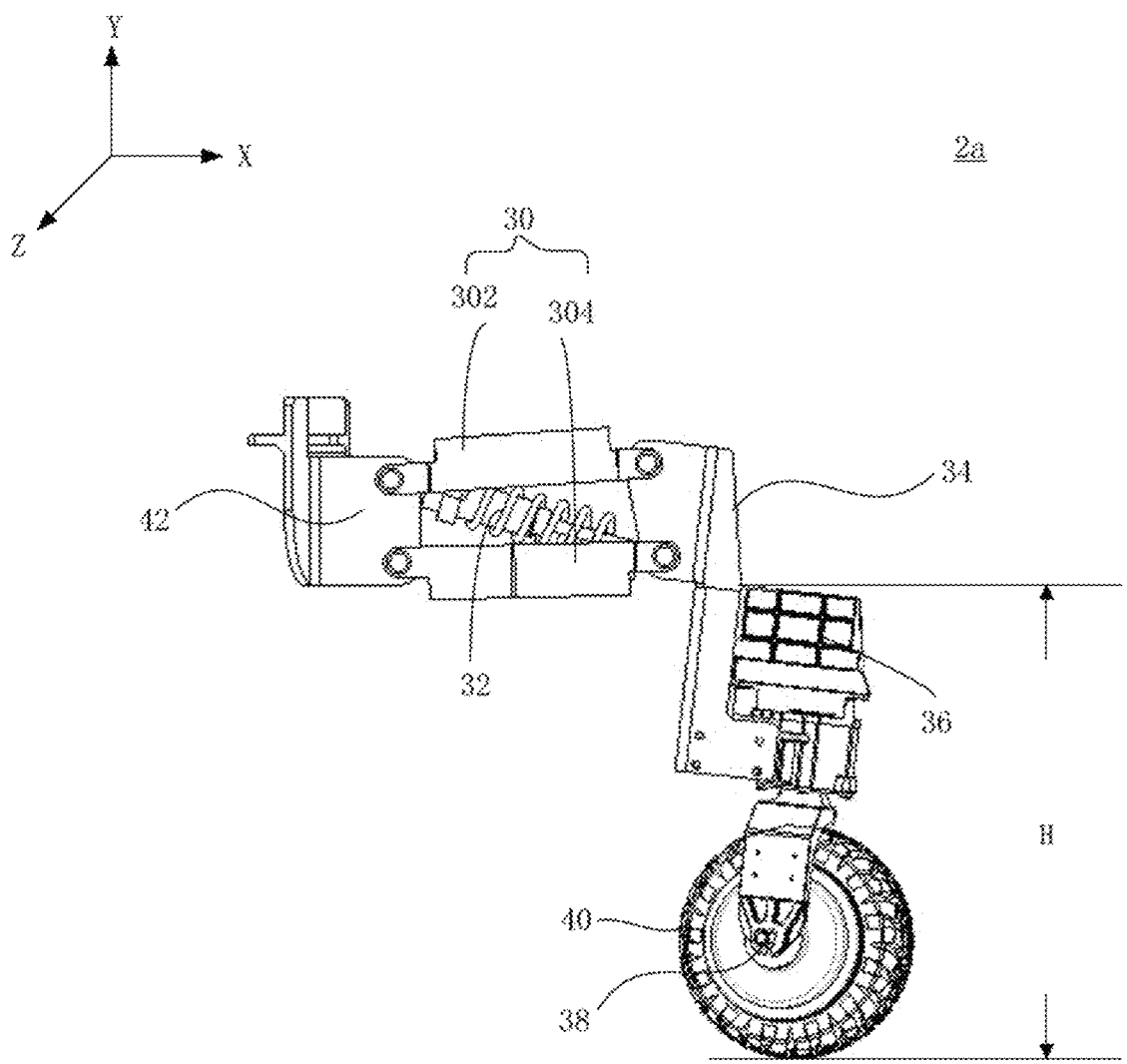
FIG. 11A is a side view of a suspension assembly in an embodiment in accordance with the present invention.
Figure 11B:
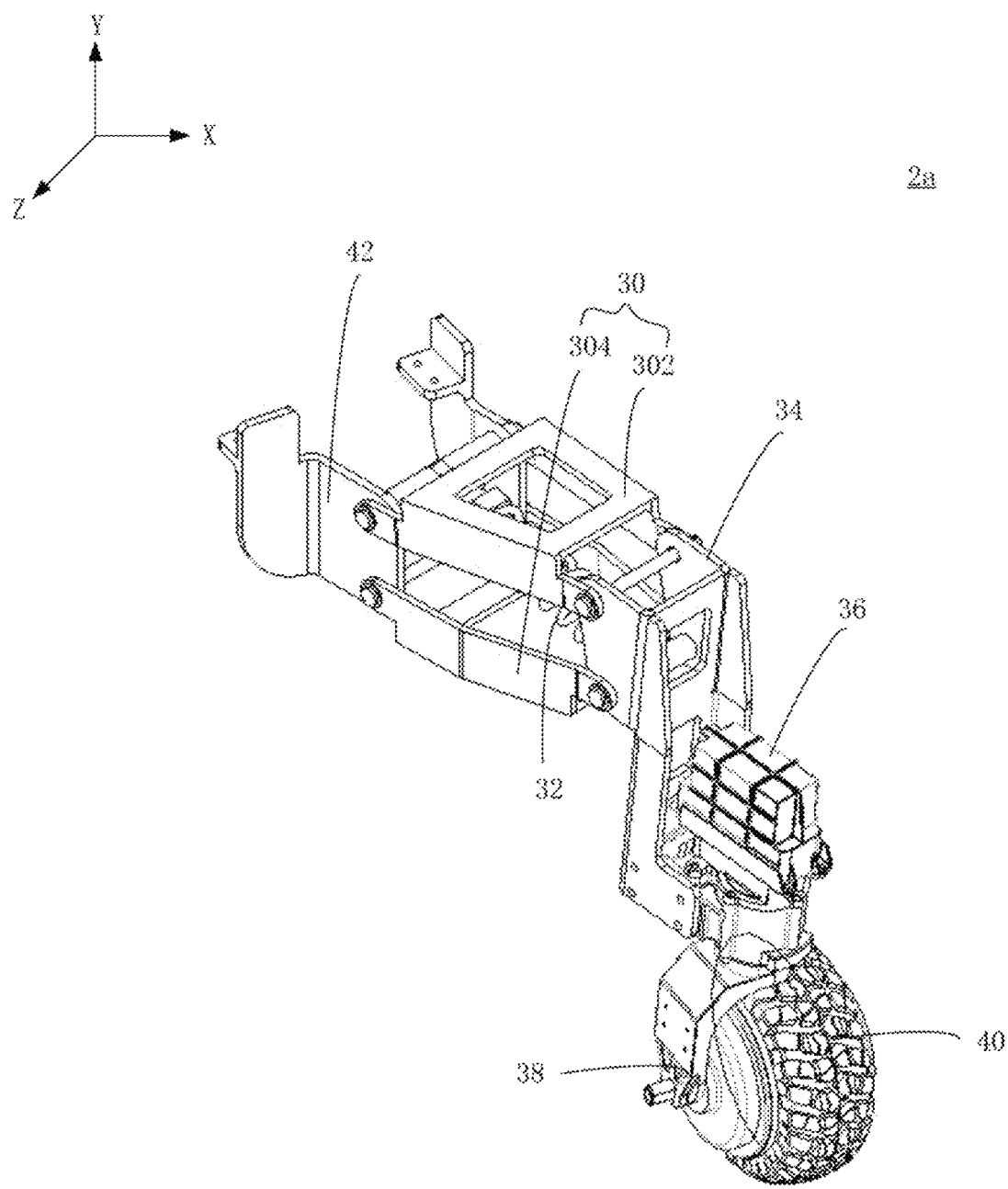
FIG. 11B is a stereogram schematic view of a suspension assembly in an embodiment in accordance with the present invention.

Next, the present invention further discloses another suspension device. Please refer to FIG. 11A and FIG. 11B. FIG. 11A is a side view of the suspension assembly in accordance with the present invention, and FIG. 11B is a stereogram schematic view of the suspension assembly in accordance with the present invention. In FIGS. 11A and 11B, the suspension assembly 2a at least includes a supporting arm set 30, a suspension spring assembly 32, a steering supporting frame 34, a steering mechanism 36 (i.e., a steering device), a hub motor 38, and a wheel set 40, where the supporting arm set 30 is composed by a first supporting arm 302 and a second supporting arm 304. The suspension spring assembly 32 is arranged between the first supporting arm 302 and the second supporting arm 304, and two ends of the suspension spring assembly 32 are respectively hinged to two ends of the first supporting arm 302 and the second supporting arm 304.

In a preferred embodiment of the present invention, the shape of the first supporting arm 302 and the second supporting arm 304 are rectangular ribs, so that the rectangular ribs as the first supporting arm 302 and the second supporting arm 304 can be separately arranged on the left and right sides of the suspension spring assembly 32, or respectively arranged on the above and below the suspension spring assembly 32. In another preferred embodiment, the number of the rectangular ribs as the first supporting arm 302 and the second supporting arm 304 can be one or two, the purpose of the number of the rectangular ribs is to allow the suspension spring assembly 32 to have a supporting point, and the suspension spring assembly 32 is pivotally connected to the first supporting arm 302 and the second supporting arm 304 in a hinged manner, so that the suspension spring assembly 32 can move in the Y direction and Z direction.

In addition, in another preferred embodiment of the present invention, the shape of one of the first supporting arm 302 and the second supporting arm 304 has a U-shaped structure, and the other can be a rectangular rib, and the two sides of the U-shaped structure are extended outward to hinge to the suspension spring assembly 32. When the first supporting arm 302 is a U-shaped structure, and arranged in an inverted manner (i.e., an inverted U-shaped) above the suspension spring assembly 32, the shape of the second supporting arm 304 can be a rectangular rib and is arranged below the first supporting arm 302 and respectively arranged on both sides of the suspension spring assembly 32. In another preferred embodiment, the shape of the first supporting arm 302 is a rectangular rib, the shape of the second supporting arm 304 is a U-shaped structure, so the first supporting arm 302 is arranged on both sides of the suspension spring assembly 32, and the second supporting arm 304 is arranged below the suspension spring assembly 32 and also under the first supporting arm 302.

In another preferred embodiment, the load capacity of the robot (not shown) or mobile vehicles (not shown) can be adjusted by adjusting the suspension spring assembly 32. There is a screw (not shown) at one end of the suspension spring assembly 32, the screw is used to adjust the elastic force of the suspension spring assembly 32, so the tighten or the loosen is adjusted by the loading weight of the robot (not shown) or the mobile vehicle (not shown) to adopt the change of the loading capacity. When the loading weight is heavier, if the adjustment range of the screw is exceeded, the spring of the suspension spring assembly 32 can be replaced to match the required loading. Thus, in a preferred embodiment, the load capacity of the robot or the mobile vehicle is adjusted by adjusting the suspension spring assembly 32.

One end of the steering supporting frame 34 is respectively hinged to one end of the first supporting arm 302 and the second supporting arm 304, and the other end of the steering supporting frame 34 is hinged to the steering mechanism 36. One end of the steering mechanism 36 facing to the horizontal plane is pivotally connected to the wheel set 40. In a preferred embodiment, the wheel set 40 further includes a hub motor 38, and the hub motor 38 is used to provide a positive or a negative torque according to the controller (not shown) to drive the traveling direction of the wheel set 40.

In another preferred embodiment, the suspension assembly 2a further includes an auxiliary wheel-lifting supporting frame 42, and the auxiliary wheel-lifting supporting frame 42 is respectively hinged to the other end of the first supporting arm 302 and the second supporting arm 304, and the other end of the auxiliary wheel-lifting supporting frame 42 is fixedly connected to the robot (not shown) or the mobile vehicle (not shown), so that the auxiliary wheel-lifting supporting frame 42 constitutes a linkage mechanism with the supporting arm set 30 and the steering supporting frame 34. The linkage mechanism is used to control the movement trajectory of the wheel set 40 when the wheel set 40 encounters a vertical obstacle.

According to the above, the supporting arm set 30, the auxiliary wheel-lifting supporting frame 42 and the steering supporting frame 34 of the suspension assembly 2a constitute the linkage mechanism, when the wheel set 40 of the suspension assembly 2a encounters a vertical obstacle, the linkage mechanism can control the movement trajectory of the wheel set 40.

It should also be added that the suspension assembly 2a includes a maximum compression height and a compression stroke, where the compression height is a height H between the steering mechanism 36 and the bottom of the wheel set 40 (as shown in FIG. 11A). In a preferred embodiment, the compression height H of the suspension assembly 2a to the wheel set 40 is 300 mm. The compression stroke of the suspension assembly 2a refers to the height at which the suspension assembly 2a lifts the wheel set 40 from the ground, and the compression stroke ranges from 0 to 200 mm.

Figure 12A:
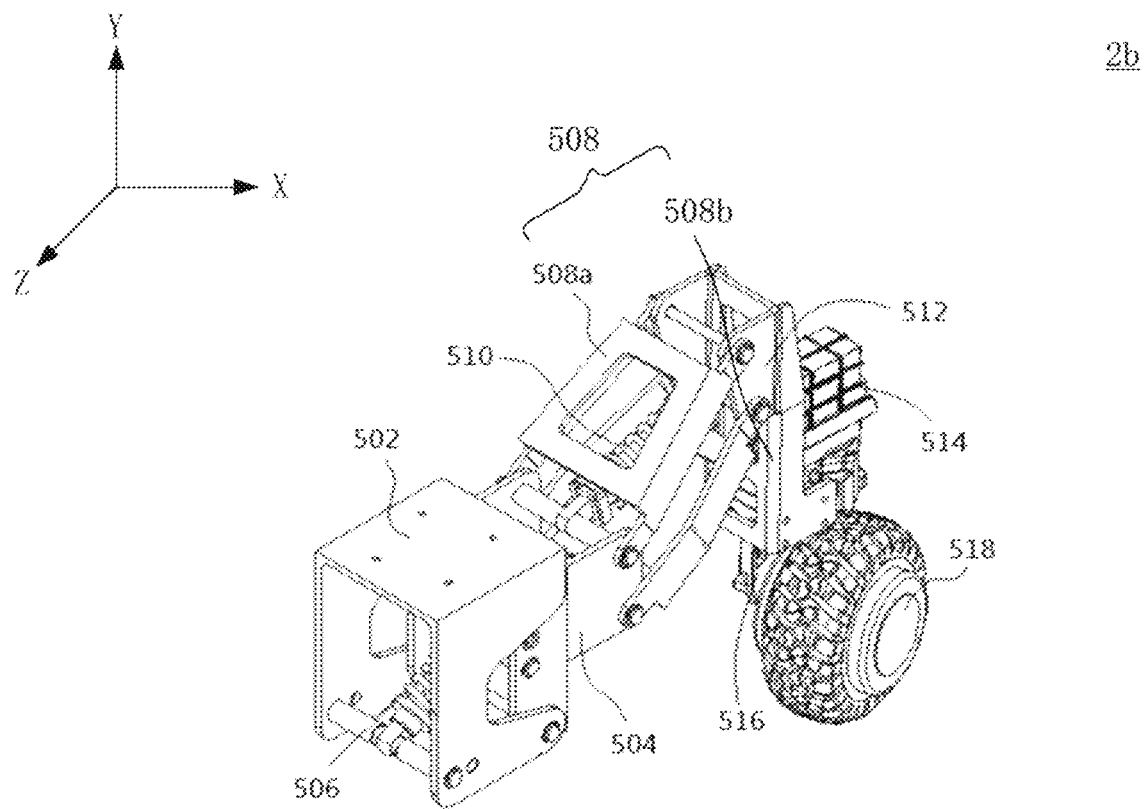
FIG. 12A is a perspective structure schematic view of a suspension assembly in another embodiment in accordance with the present invention.
Figure 12B:
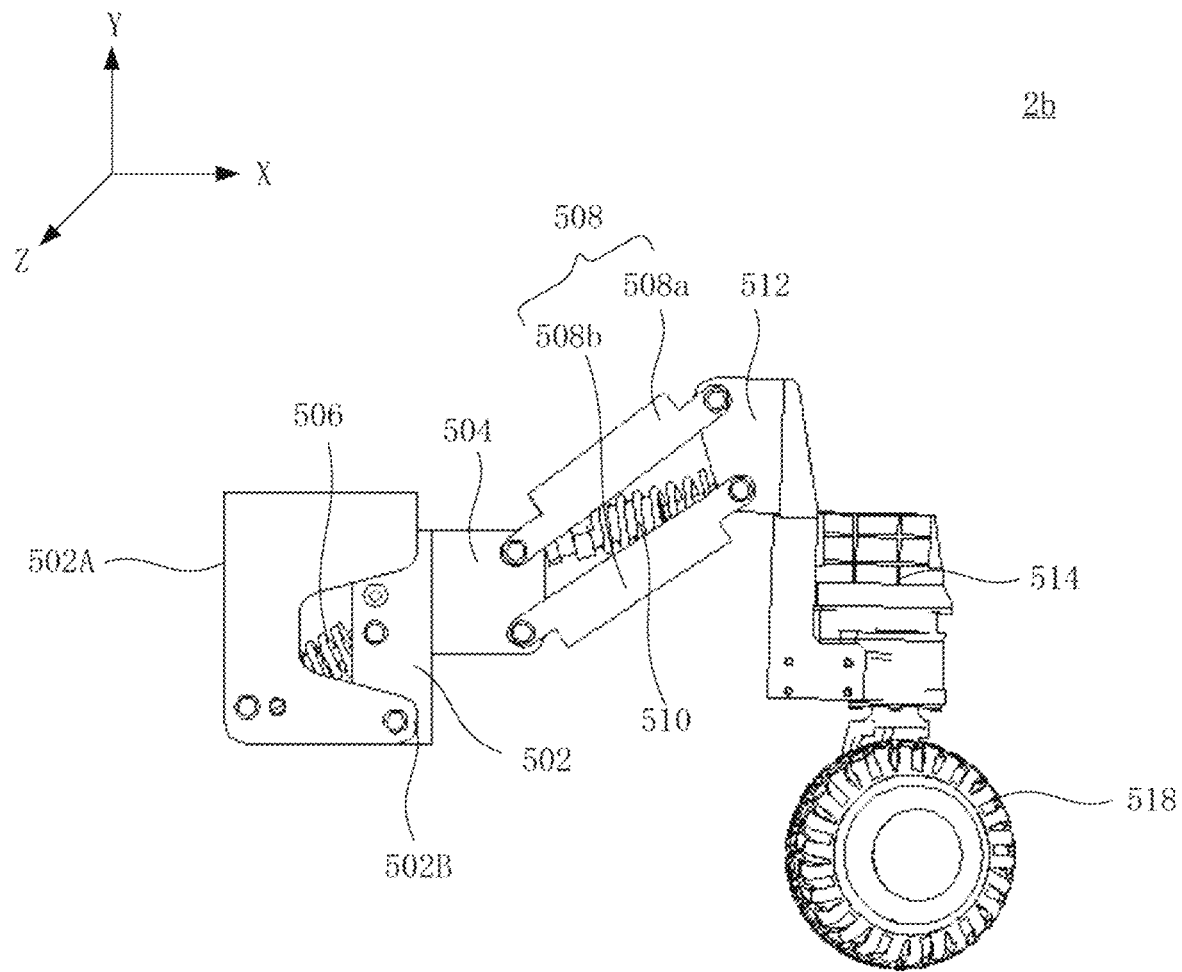
FIG. 12B is a side view of a suspension assembly in another embodiment in accordance with the present invention.

Next, the present invention further discloses another suspension assembly. Please refer to FIG. 12A to FIG. 12B. FIG. 12A is a perspective structure schematic view of a suspension assembly in another embodiment in accordance with the present invention, and FIG. 12B is a side view of the suspension assembly in another embodiment in accordance with the present invention. In this embodiment, the difference between FIG. 11A to FIG. 11B is that the suspension assembly 2b further includes a suspension fixing seat 502 and an auxiliary wheel-lifting spring assembly 506.

In FIG. 12A and FIG. 12B, the suspension assembly 2b at least includes a suspension fixing seat 502, an auxiliary wheel-lifting supporting frame 504, the auxiliary wheel-lifting spring assembly 506, a supporting arm set 508, a suspension spring assembly 510, a steering supporting frame 512 and a steering mechanism 514. The wheel set 518 is pivotally connected to one end of the steering mechanism 514 faced toward the horizontal plane direction, and a hub motor 516 is pivotally connected to the wheel set 518 to drive the wheel set 518. In which, one end 502A of the suspension fixing seat 502 is fixedly connected to the robot (not shown) or the mobile vehicle (not shown), and one end of the auxiliary wheel-lifting supporting frame 504 is hinged to the other end 502B of the suspension fixing seat 502. One end of the auxiliary wheel-lifting spring assembly 506 is passed through and is hinged to the suspension fixing seat 502, and the other end of the auxiliary wheel-lifting spring assembly 506 is hinged to the other end of the auxiliary wheel-lifting supporting frame 504. The supporting arm set 508 is composed by a first supporting arm 508a and a second supporting arm 508b, one end of the first supporting arm 508a is hinged to the other end of the auxiliary wheel-lifting supporting frame 504, and the other end of the first supporting arm 508a is steering supporting frame 512. The second supporting arm 508b is arranged at both side of the auxiliary wheel-lifting supporting frame 504, one end of the second supporting arm 508b is hinged to the auxiliary wheel-lifting supporting frame 504, and the other end of the second supporting arm 508b is hinged to the steering supporting frame 512. The arrangement and the structure of the first supporting arm 508a and the second supporting 508b of the supporting arm set 508 are the same as the supporting arms described above, which will not be repeated herein.

The objective of the supporting arm set 508 is used to connect the auxiliary wheel-lifting supporting frame 504 and the steering supporting frame 512. The two ends of the supporting arm set 508 are respectively hinged to the auxiliary wheel-lifting supporting frame 504 and the steering supporting frame 512, so the height of the auxiliary wheel-lifting supporting frame 504 and the steering supporting frame 512 can be adjusted with the heights of entire suspension assembly 2b through the supporting arm set 508. The two ends of the suspension spring assembly 510 are respectively hinged to two ends of the first supporting arm 508a and the second supporting arm 508b. One end of the steering supporting frame 512 is hinged to one end of the steering mechanism 514, and the other end of the steering mechanism 514 facing to the horizontal plane is pivotally connected to the wheel set 518. According to the above, the supporting arm set 508, the auxiliary wheel-lifting supporting frame 504 and the steering supporting frame 512 of the suspension assembly 2b constitute a linkage mechanism, so the suspension assembly 2b can control the movement trajectory of the wheel set 518 through the linkage mechanism when the wheel set 518 encounters a vertical obstacle.

In this embodiment, the load capacity of the robot (not shown) or the mobile vehicle (not shown) can be adjusted by adjusting the suspension spring assembly 510. There is a screw (not shown) at one end of the suspension spring assembly 510, and the screw is used to adjust the elastic force of the suspension spring assembly 510, so the tighten or loosen is adjusted by the loading weight of the robot (not shown) or the mobile vehicle (not shown) to adopt the change of the loading capacity. When the loading weight is heavier, if the adjustment range of the screw is exceeded, the spring of the suspension spring assembly 510 can be replaced to match the required loading capacity if the adjusting range of the screw (not shown) is out of scope. Thus, in this embodiment, the load capacity of the robot (not shown) or the mobile vehicle (not shown) is adjusted by adjusting the suspension spring assembly 510.

It should also be added that in the suspension assemblies 2a, 2b disclosed in the present invention, the hub motors 38, 516 are used to drive the steering of the wheel sets 40, 518. In addition, the suspension assembly 2a, 2b also include sensors (not shown) to detect the positions and the speed of the wheel sets 40, 518 and the height between the wheel sets 40, 518 and the horizontal plane. Furthermore, the sensors (not shown) can also monitor the current positions of the steering mechanism 36, 514 and the suspension assemblies 2a, 2b.

Moreover, the suspension assemblies 2a, 2b further include controllers (not shown) to receive the positions and the speed of the wheel sets 40, 518 and the height between the wheel sets 40, 518 and the horizontal plane detected and transferred by the sensors (not shown) to control the steering of the wheel sets 40, 518 and the suspension height of the suspension assemblies 2a, 2b.

Thus, according to the above, after the suspension assemblies 2a, 2b disclosed by the present invention are connected to the robot (not shown) or the mobile vehicle (not shown), when the robot (not shown) or the mobile vehicle (not shown) encounters a vertical obstacle such as a step, while traveling, the wheel sets 40, 518 connected to the suspension assemblies 2a, 2b can provide a positive torque or a negative torque according to the control of the controllers (not shown) to drive the traveling directions of the wheel sets 40, 518, while the wheel set 40, 518 only rotate forward or reverse. The friction forces are generated between the wheel sets 40, 518 and the vertical surface of the step, and the upward component forces is also generated at the same time. Because the suspension assemblies 2a, 2b compress the wheel sets 40, 518 with a height of 300 mm, and the compression strokes range from 0 to 200 mm. This upward component forces overcomes the tension of the suspension spring assemblies 32, 510 under the cooperation of the compression strokes, the wheel sets 40, 518 will be lifted by the suspension assemblies 2a, 2b and move upward along the vertical surface of the step until the wheel set 40, 518 exceeds the vertical surface of the step, and the suspension spring assemblies 32, 510 generate a tension forces in X direction (horizontal direction) to allow the wheel set 40, 518 move forward to complete the obstacle crossing.

In a preferred embodiment, for example, the total load capacity of the robot or the mobile vehicle (i.e., the weight of the robot or the mobile vehicle plus the available loading weight, and the available loading weight includes the goods or the people delivered by the robot or the mobile vehicle) is 100 kg, for example, the 6 suspension assemblies are used, the compression height of each suspension assemblies 2a, 2b to the wheel set 40, 518 is 300 mm, the compression stoke of the suspension assemblies 2a, 2b ranges from 0 to 200 mm. The obstacle crossing ability of the robot or the mobile vehicle is proportional to the maximum compression strokes value of the suspension assemblies 2a, 2b. When the compression heights of the wheel sets 40, 518 are larger, the compressibility of the suspension spring assemblies 32 (as shown in FIG. 11A and FIG. 11B), 510 (as shown in FIG. 12A and FIG. 12B) are stronger, and the compression strokes of the suspension assemblies 2a, 2b are larger, the obstacle crossing ability is stronger. However, if the maximum compression stroke is too large, the driving stability of the robot or the mobile vehicle will be decreased. Especially, when the available loading weight of the robot or vehicle is larger, as the maximum compression stoke of the suspension assemblies 2a, 2b increase, the driving stability of the robot or vehicle will decrease sharply. At this time, the solution method is possible to increase the structural stability of the suspension assemblies 2a, 2b or increase the number of the wheel sets (for example, 8 wheels, 10 wheels or 12 wheels) to improve the driving stability. After experimental testing, it can be obtained that when the total loading capacity reaches 100 kg, the maximum compression strokes of the suspension assemblies 2a, 2b exceed 200 mm, the driving stability will be significantly reduced. When the robot or the mobile vehicle is driving on an uneven road such as a gravel road, the vehicle body will be shaken extremely.

Figure 13A:
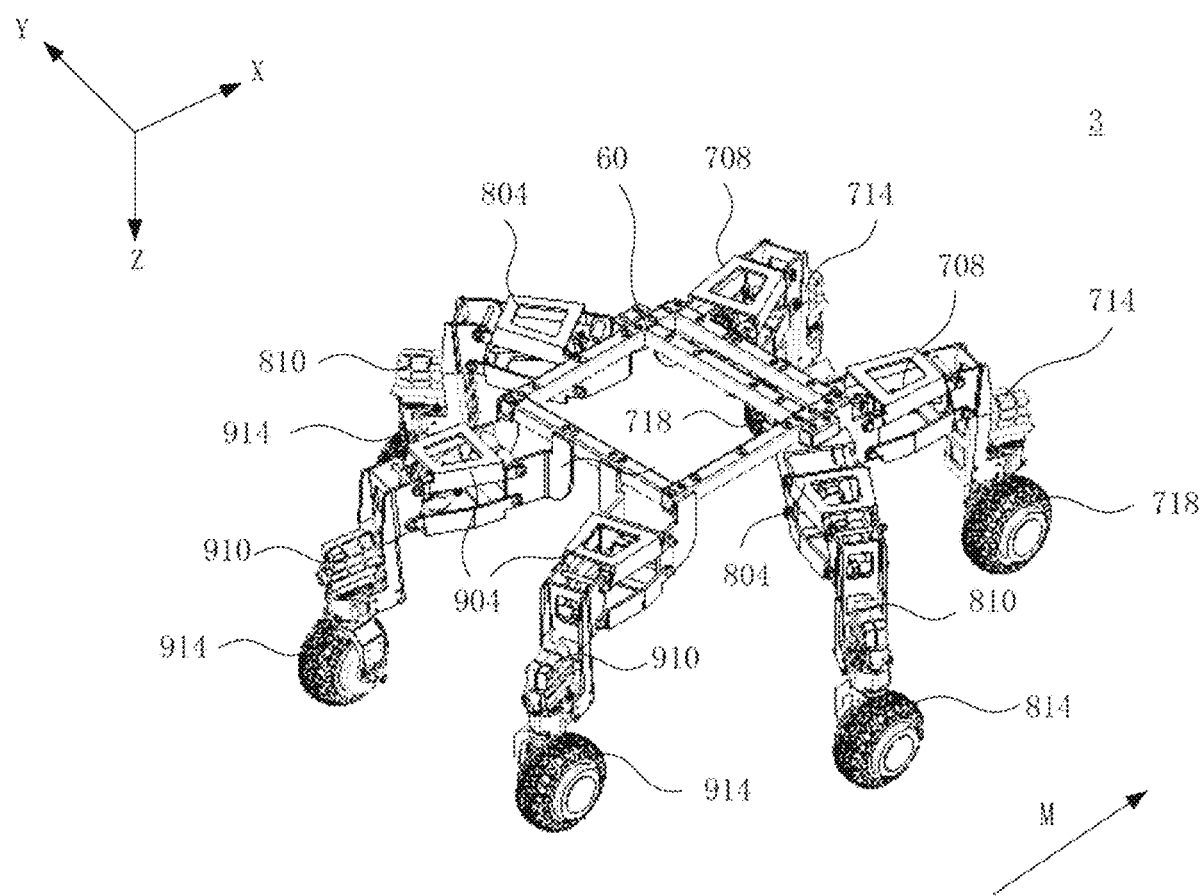
FIG. 13A is a perspective view of a six-wheel bionic chassis in an embodiment in accordance with the present invention.
Figure 13B:
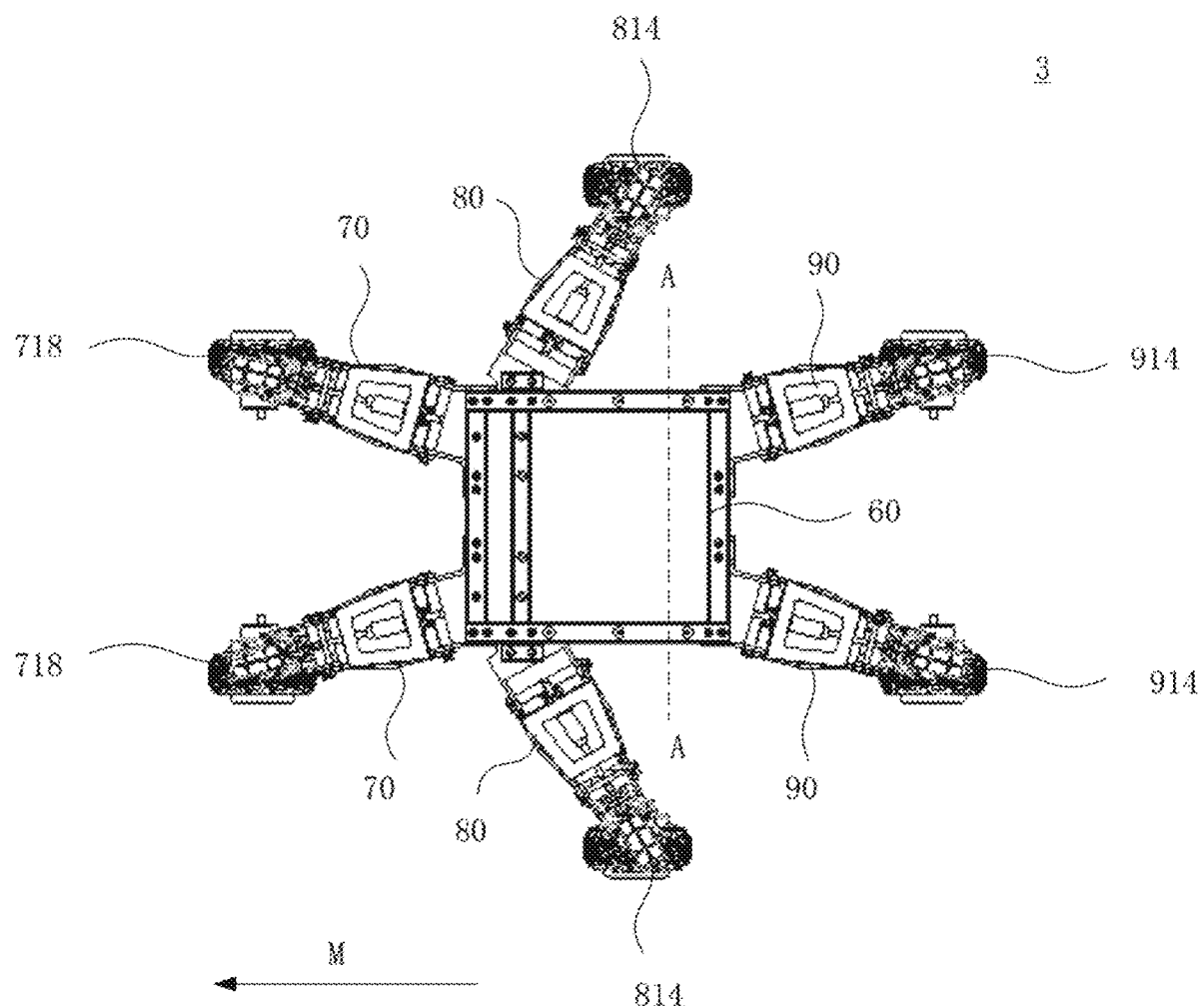
FIG. 13B is a top view of the six-wheel bionic chassis in an embodiment in accordance with the present invention.
Figure 13C:
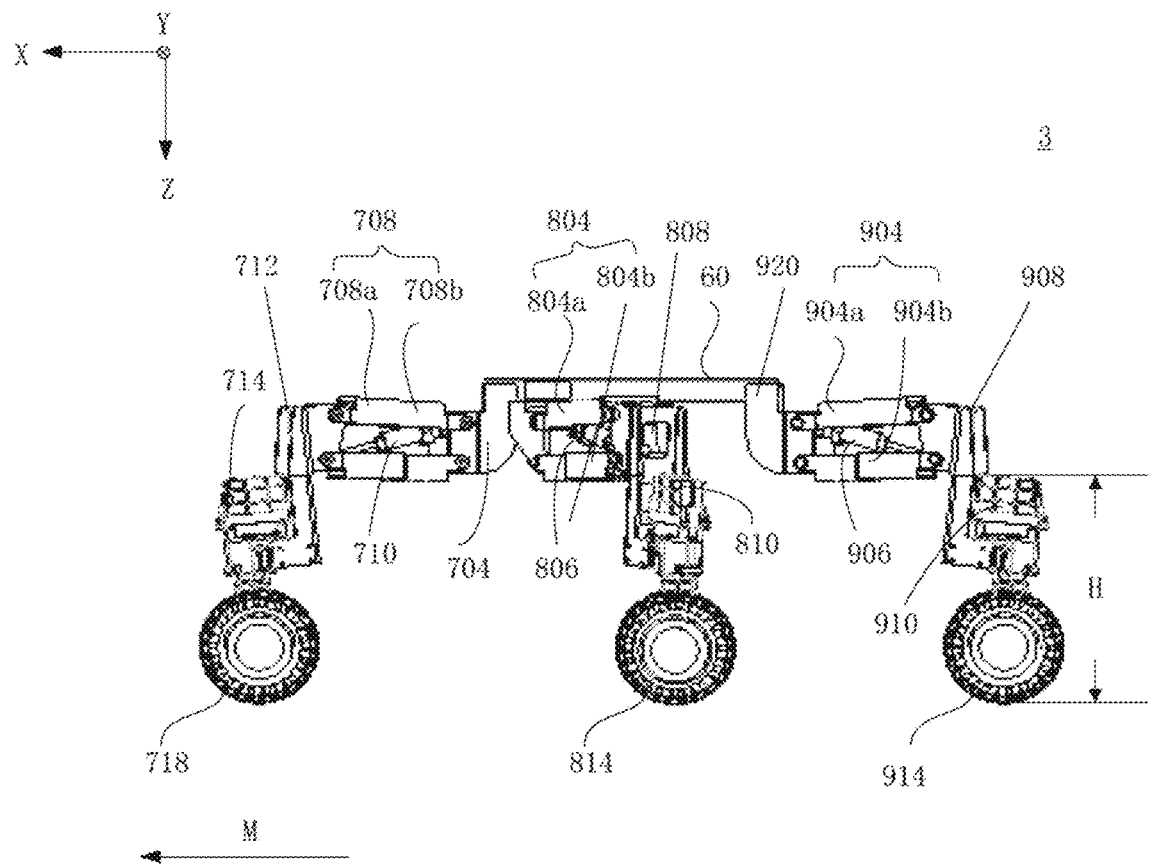
FIG. 13C a top view of the six-wheel bionic chassis along A-A line segment of FIG. 13B in an embodiment in accordance with the present invention.
Figure 13D:
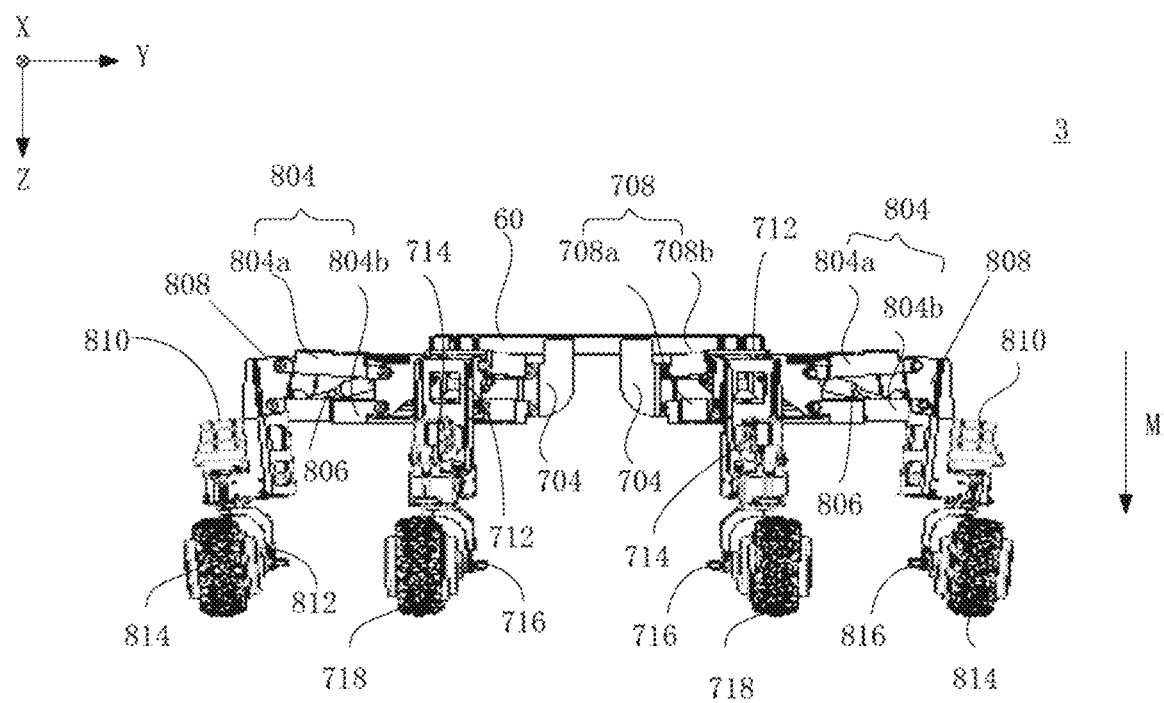
FIG. 13D is a side view of the six-wheel bionic chassis in an embodiment in accordance with the present invention.

According to the above, the present invention further discloses a six-wheel bionic chassis. Please refer to FIG. 13A to FIG. 13D. FIG. 13A is a stereogram schematic view of the six-wheel bionic chassis in one embodiment disclosed by the present invention, FIG. 13B is a top view of the six-wheel bionic chassis in an embodiment disclosed by the present invention, FIG. 13C is a top view of the six-wheel bionic chassis along A-A line segment of FIG. 13B in an embodiment disclosed by the present invention, and FIG. 13D is a side view of the six-wheel bionic chassis in an embodiment disclosed by the present invention. In FIG. 13A and FIG. 13B, a six-wheel bionic chassis 3 is composed by at least a chassis frame 60, a front wheel suspension assembly 70, a middle wheel suspension assembly 80 and a rear wheel suspension assembly 90. The chassis frame 60 further includes an upper surface and a bottom surface, in which the bottom surface is a surface that facing the ground (or road surface), so the front wheel suspension assembly 70, the middle wheel suspension assembly 80 and the rear wheel suspension assembly 90 are arranged on the surface that facing to the road surface. The front wheel suspension assemblies 70 are arranged at both sides of the front end of the chassis frame 60 (right side of FIG. 13A and FIG. 13B), the middle wheel suspension assemblies 80 are arranged between the front end and the rear end of the chassis frame 60, and the rear wheel suspension assemblies 80 are arranged at both sides of the rear end of the chassis frame 60 (left side of FIG. 13A and FIG. 13B). The front wheel suspension assembly 70, the middle wheel suspension assembly 80 and the rear wheel suspension assembly 90 are pivotally connected to a front wheel set 718, a middle wheel set 814 and a rear wheel set 914 respectively. It should be added that the middle wheel suspension assembly 80 can be arranged at middle of the chassis frame 60, a position near the front end or the rear end of the chassis frame 60 according to user's design.

Please refer to FIG. 13A, FIG. 13C and FIG. 13D simultaneously. The front wheel suspension assemblies 70, the middle wheel suspension assemblies 80 and the rear wheel suspension assemblies 90 are symmetrically arranged at the chassis frame 60, so in order to simply the description of the structure of the six-wheel bionic chassis 3, the following description is to state one front wheel suspension assembly 70, one middle wheel suspension assembly 80 and one rear wheel suspension assembly 90. In addition, as shown in FIG. 13A to FIG. 13D, the arrow M indicates the traveling direction of the six-wheel bionic chassis 3.

The front wheel suspension assembly 70 at least includes a front wheel upper supporting arm set 708, a front wheel suspension spring assembly 710, a front wheel steering supporting frame 712, a front wheel steering mechanism 714, a front wheel hub motor 716 and a front wheel set 718, in which one end of the front wheel auxiliary supporting frame 704 is hinged to the front end of the chassis frame 60. The front wheel upper supporting arm set 708 is composed by a first front wheel upper supporting arm 708a and a pair of second front wheel upper supporting arm 708b, one end of the first front wheel upper supporting arm 708a is hinged to the other end of the front wheel auxiliary wheel-lifting supporting frame 704, and the other end of the first front wheel upper supporting arm 708a is hinged to the front wheel steering supporting frame 712. The pair of the second front wheel upper supporting arms 708b are respectively arranged at both sides of the front wheel auxiliary wheel-lifting supporting frame 704, one end of the second front wheel upper supporting arms 708b are hinged to one end of the front wheel auxiliary wheel-lifting supporting frame 704, and the other end of the second front wheel upper supporting arms 708b are hinged to the front wheel steering frame 712. The arrangement of the first front wheel upper supporting arm 708a is arranged at the front wheel auxiliary wheel-lifting supporting frame 704 and the front wheel steering supporting frame 712 is that the first front wheel supporting arm 708a is arranged above the second front wheel upper supporting arms 708b.

In addition, in one preferred embodiment of the present invention, the first front wheel upper supporting arm 708a is an inverted U-shaped structure, and the two sides of the inverted U-shaped structure are extended outward to separately hinge to the front wheel auxiliary wheel-lifting supporting frame 704 and the front wheel steering supporting frame 712. The second front wheel upper supporting arms 708b is a pair of rectangular ribs, which are respectively arranged at both sides of the front wheel auxiliary wheel-lifting supporting frame 704 and the front wheel steering supporting frame 712, and the pair of the second front wheel upper supporting arms 708b are arranged below the inverted U-shaped structure first front wheel upper supporting arm 708a. The objective of the front wheel upper supporting arm set 708 is used to connect the front wheel auxiliary wheel-lifting supporting frame 704 and the front wheel steering supporting frame 712. Since the two ends of the front wheel upper supporting arm set 708 are hinged to the front wheel auxiliary wheel-lifting supporting frame 704 and the front wheel steering supporting frame 712, so the heights of the front wheel auxiliary wheel-lifting supporting frame 704 and the front wheel steering supporting frame 712 are adjusted according to the height of the whole six-wheel bionic chassis 3 by the front wheel upper supporting arm set 708. The front wheel suspension spring assembly 710 is placed in a space which is constructed by the first front wheel upper supporting arm 708a and the pair of the second front wheel upper supporting arms 708b, and the two ends of the front wheel suspension spring assembly 710 are respectively hinged to the two ends of the first front wheel upper supporting arm 708a and the second front wheel upper supporting arms 708b. One end of the front wheel steering supporting frame 712 is fixedly connected to one end of the front wheel steering mechanism 714, the other end faced along a ground direction is pivotally connected to the front wheel set 718, and the front wheel set 718 is pivotally connected to the front wheel hub motor 716. According to the above, a front wheel linkage mechanism is constituted by the front wheel upper supporting arm set 708, the front wheel auxiliary wheel-lifting supporting frame 704 and the front wheel steering supporting frame 712 of the front wheel suspension 70, so the six-wheel bionic chassis 3 can control a movement trajectory of the front wheel set 718 through the front wheel linkage mechanism when the front wheel set 718 encounters a vertical obstacle.

Please refer to FIG. 13A, FIG. 13C and FIG. 13D. The middle wheel suspension assembly 80 at least includes a middle wheel upper supporting arm set 804, a middle wheel suspension spring assembly 806, a middle wheel steering supporting frame 808, a middle wheel steering mechanism 810, a middle wheel hub motor 812 and a middle wheel set 814. Therein, the middle wheel upper supporting arm set 804 is composed by a first middle wheel upper supporting arm 804a and a pair of the second middle wheel upper supporting arms 804b, one end of the first middle wheel upper supporting arm 804a is hinged to the chassis frame 60, the other end of the first middle wheel upper supporting arm 804a is hinged to the middle wheel steering supporting frame 808, one ends of the pair of the second middle wheel upper supporting arms 804b are hinged to the chassis frame 60, and the other ends of the second middle wheel upper supporting arms 804b are hinged to the middle wheel steering supporting frame 808, in which the first middle wheel upper supporting arm 804a is arranged above the second middle wheel upper supporting arms 804b. The middle wheel suspension spring assembly 806 is arranged in a space composed by the first middle wheel upper supporting arm 804a and the middle wheel upper supporting arms 804b, and two ends of the middle spring assembly 806 are respectively hinged to the two ends of the first middle wheel upper supporting arm 804a and the middle wheel upper supporting arms 804b.

In addition, according to a preferred embodiment of the present invention, in the same way as the front wheel upper supporting arm set 708, the first middle wheel upper supporting arm 804a has an inverted U-shaped structure, and the two sides of the inverted U-shaped structure are extended outward to hinged to the chassis frame 60. The second middle wheel upper supporting arms 804b are a pair of rectangular ribs, in which one ends of the second middle wheel upper supporting arms 804b are hinged to middle of the chassis frame 60, the other ends of the second middle wheel upper supporting arms 804b are hinged to the middle wheel steering supporting frame 808 and arranged below the first middle wheel upper supporting arm 804a. Therein, the objective of the middle upper supporting arm set 804 is used to connected to the chassis frame 60 and the middle wheel steering supporting frame 808. One end of the middle wheel steering supporting frame 808 is fixedly connected to the middle wheel steering mechanism 808, the other end faced along a ground direction of the middle wheel steering mechanism 808 is pivotally connected to the middle wheel set 814, and the middle wheel set 814 is pivotally connected to the middle wheel hub motor 812. According to the above, a middle wheel linkage mechanism is constituted by the middle wheel upper supporting arm set 804 and the middle wheel steering supporting frame 808, so the six-wheel bionic chassis 3 can control a movement trajectory of the middle wheel set 814 when the middle wheel set 804 encounters a vertical obstacle.

The rear wheel suspension assembly 90 at least includes a rear wheel upper supporting arm set 904, a rear wheel suspension spring assembly 906, a rear wheel steering supporting frame 908, a rear wheel steering mechanism 910, a rear wheel hub motor (not shown) and a rear wheel set 914. Therein, the rear wheel upper supporting arm set 904 is composed by a first rear wheel upper supporting arm 904*a* and a pair of second rear wheel upper supporting arms 904*b*, one end of the first rear wheel upper supporting arm 904*a* is hinged to the rear end of the chassis frame 60, the other end of the first rear wheel upper supporting arm 904*a* is hinged to the rear wheel steering supporting frame 908, one ends of the second rear wheel upper supporting arms 904*b* are hinged to the rear end of the chassis frame 60, and the other end of the second rear wheel upper supporting arms 904*b* are hinged to the rear wheel steering supporting frame 908, in which the first rear wheel upper supporting arm 904*a* is arranged above the pair of the second rear wheel upper supporting arms 904*b*. The rear wheel suspension spring assembly 906 is arranged in a space composed by the first rear wheel upper supporting arm 904*a* and the second rear wheel upper supporting arms 904*b*, and two ends of the rear wheel suspension spring assembly 906 are hinged respectively to the two ends of the first rear wheel upper supporting arm 904*a* and the second rear wheel upper supporting arms 904*b*.

Furthermore, in one preferred embodiment, the first rear wheel upper supporting arm 904*a* has an inverted U-shaped structure, and the two sides of the inverted U-shaped structure are extended outward to separately hinged to the chassis frame 60 and the rear wheel steering supporting frame 908. The pair of the second rear wheel upper supporting arms 904*b* are a pair of rectangular ribs, one ends of the second rear wheel upper supporting arms 904*b* are hinged to the rear end of the chassis frame 60, the other ends of the rear wheel upper supporting arms 904*b* are hinged to both sides of the rear wheel steering supporting frame 908, and the rear wheel upper supporting arms 904*b* are arranged below the inverted U-shaped first rear wheel supporting arm 904*a*. Therein, the objective of the rear wheel upper supporting arm 904 is used to connect the rear end of the chassis frame 60 and the rear wheel steering supporting frame 908. One end of the rear wheel steering supporting frame 809 is fixedly connected to the rear wheel steering mechanism 910, the other end faced along a ground direction is pivotally connected to the rear wheel set 914, and the rear wheel set 914 is pivotally connected to the rear wheel hub motor (not shown). According to the above, a rear wheel linkage mechanism is constituted by the rear wheel upper supporting arm set 904 and the rear wheel steering supporting frame 908 of the rear wheel suspension assembly 90, so the six-wheel bionic chassis 3 can control a movement trajectory of the rear wheel set 914 through the rear wheel linkage mechanism when the rear wheel set 914 encounters a vertical obstacle.

It should be added that the first front wheel upper supporting arm 708*a* of the front wheel upper supporting arm set 708, the first middle wheel upper supporting arm 804*a* of the middle wheel upper supporting arm set 804 and the first rear wheel upper supporting arm 904*a* of the rear wheel upper supporting arm set 904 can be an inverted U-shaped structure described above. In another embodiment, the first front wheel upper supporting arm 708*a* of the front wheel upper supporting arm set 708, the first middle wheel upper supporting arm 804*a* of the middle wheel upper supporting arm set 804 and the first rear wheel upper supporting arm 904*a* of the rear wheel upper supporting arm set 904 can also be a pair of rectangle ribs, in which the connecting method are the same as the inverted U-shaped structure which will not describe herein.

Therefore, according to the above, when the six-wheel bionic chassis 3 disclosed by the present invention is encountering a vertical obstacle (not shown), the front wheel suspension assembly 90, the middle wheel suspension assembly 80 and the rear wheel suspension assembly 90 have compression heights and compression strokes respectively, in which the compression heights are the height H (as shown in FIG. 13C) between top of the steering mechanisms (such as the front wheel steering mechanism 714, the middle wheel steering mechanism 810 or the rear wheel steering mechanism 910) and bottom of the wheel sets (such as the front wheel set 718, the middle wheel set 814 or the rear wheel set 914). In a preferred embodiment of the present invention, the compression heights H of the front wheel suspension assembly 70, the middle wheel suspension assembly 80 and the rear wheel suspension assembly 90 to the wheel sets (such as the front wheel set 718, the middle wheel set 814 or the rear wheel set 914) are 300 mm. Furthermore, the compression strokes of the front wheel suspension assembly 70, the middle wheel suspension assembly 80 and the rear wheel suspension assembly 90 refer the heights at which the front wheel suspension assembly 70, the middle wheel suspension assembly 80 or the rear wheel suspension assembly 90 respectively lift the front wheel set 718, the middle wheel set 814 or the rear wheel set 914 from the ground. In a preferred embodiment of the present invention, the compression stroke ranges from 0 to 200 mm. Thus, when the six-wheel bionic chassis 3 encounters a vertical obstacle and the height of the vertical obstacle cannot be crossed by lifting the front wheel set 718 of the six-wheel bionic chassis 3, at this time the pressing forces produced from the middle wheel set 814 and the rear wheel set 914 to the front wheel set 718 can compress the front wheel suspension assembly 70, so to cross the obstacle through lifting the front wheel set 718 driven by the front wheel upper supporting arm set 708, the front wheel auxiliary supporting frame 704 and the front wheel steering supporting frame 712 of the front wheel linkage mechanism. The two ends of the middle wheel upper supporting arm set 804 of the middle wheel suspension assembly 80 are respectively hinged to the chassis frame 60 and the middle wheel steering supporting frame 808, and the two ends of the rear wheel upper supporting arm set 904 of the rear wheel suspension assembly 90 are respectively hinged to the chassis frame 60 and the rear wheel steering supporting frame 908. Thus, the middle wheel upper supporting arm set 804 and the rear wheel upper supporting arm set 904 can not only move along Y direction but also move along Z direction, such as motions of arthropod's legs. The middle wheel upper supporting arm set 804 and the rear wheel upper supporting arm set 904 can respectively move along different directions, so the middle wheel upper supporting arm set 804 and the rear wheel upper supporting arm set 904 can respectively drive the middle wheel steering supporting frame 808 and the rear wheel steering supporting frame 908 to cross the obstacle by lifting the middle wheel set 814 and the rear wheel set 914.

Figure 14A:
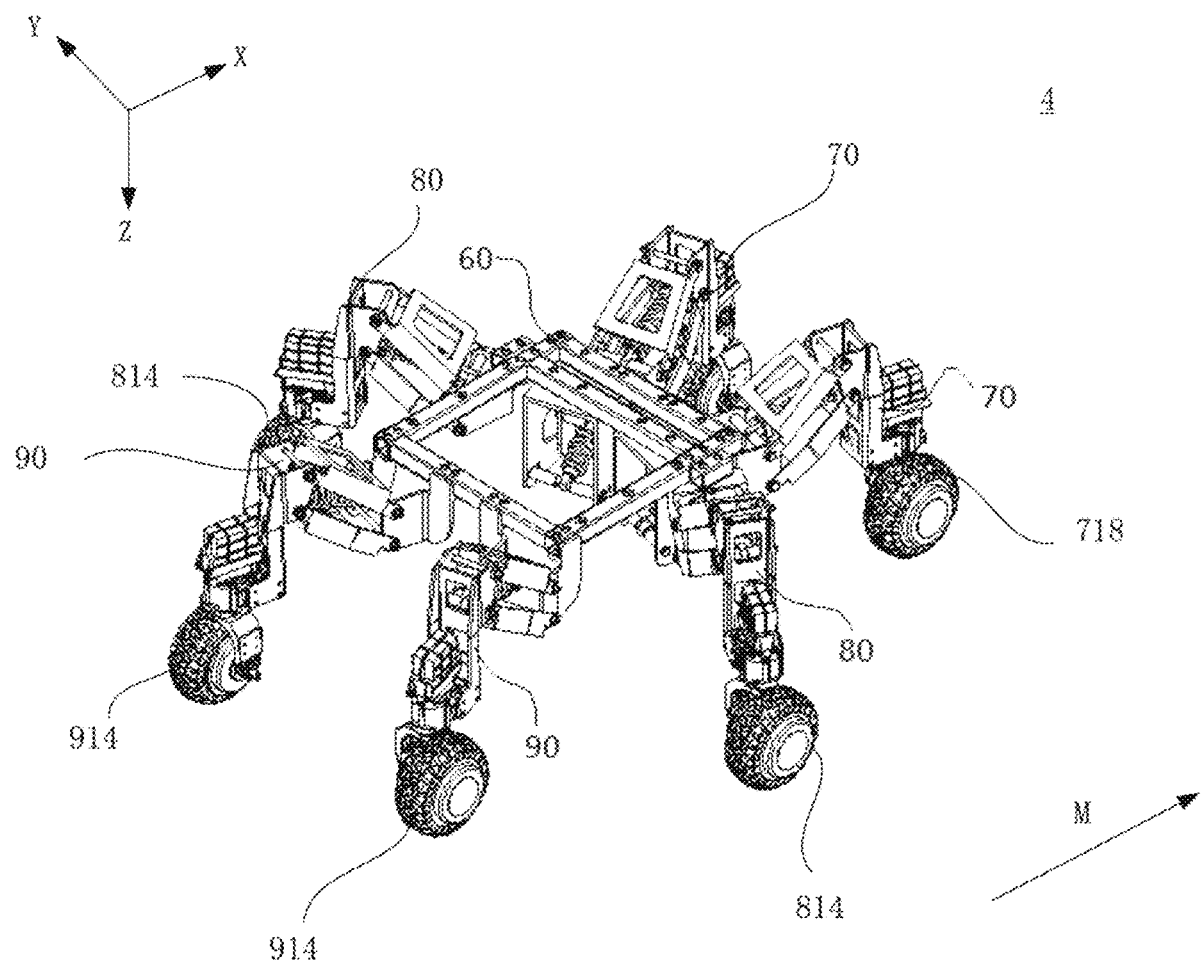
FIG. 14A is a perspective schematic view of a six-wheel bionic chassis in accordance with the present invention.
Figure 14B:
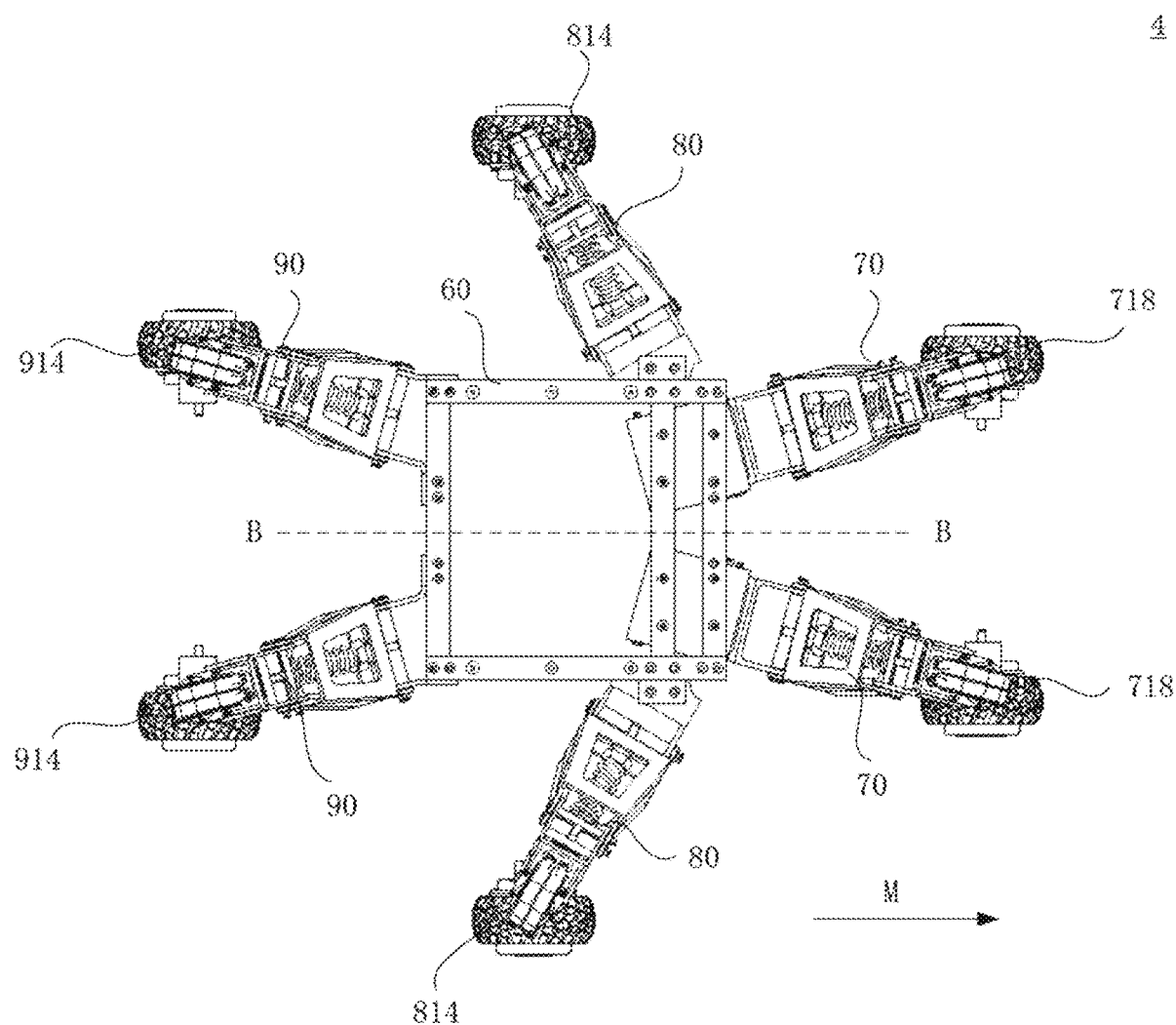
FIG. 14B is a top view of the six-wheel bionic chassis in accordance with the present invention.
Figure 14C:
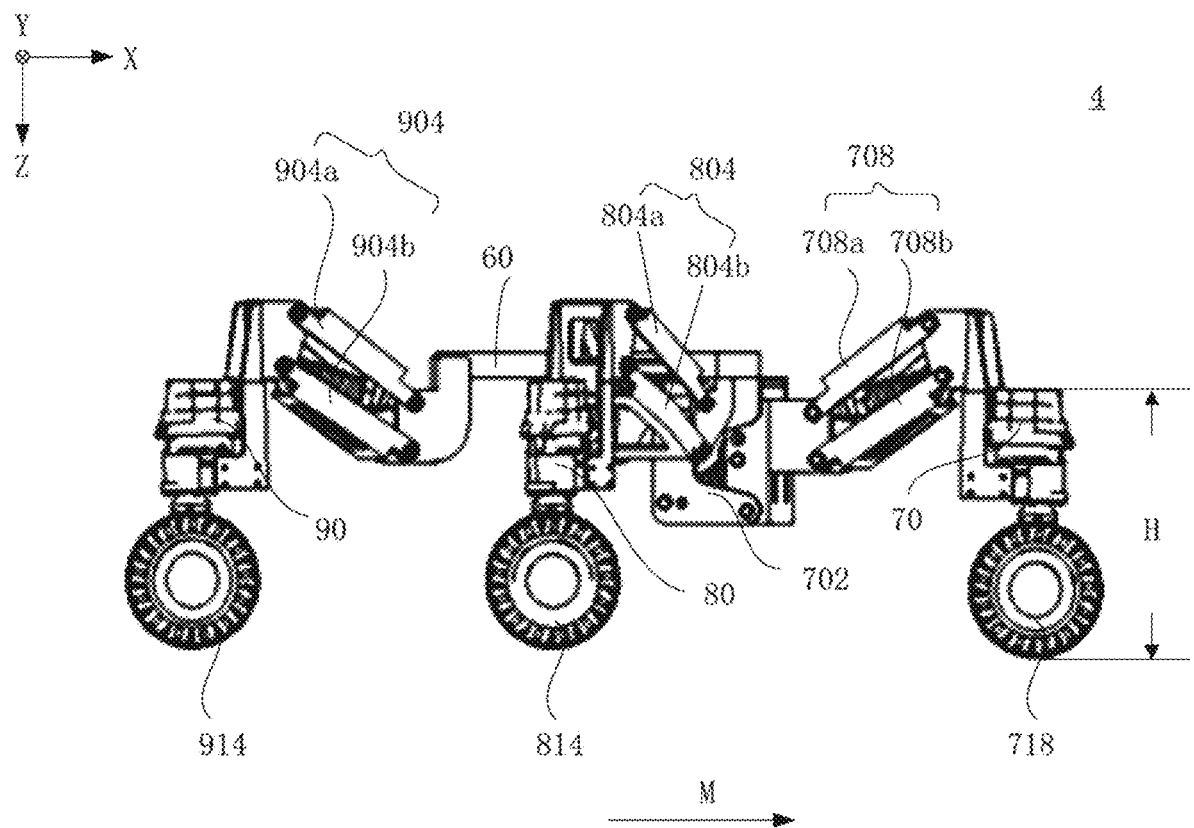
FIG. 14C is a cross-sectional view of the six-wheel bionic chassis along B-B line segment of FIG. 14B in accordance with the present invention.

Next, the present invention further discloses another six-wheel bionic chassis, please refer to FIG. 14A to FIG. 14C. FIG. 14A is a stereogram schematic view of a six-wheel bionic chassis in another embodiment disclosed by the present invention, FIG. 14B is a top view of the six-wheel bionic chassis in another embodiment disclosed by the present invention, and FIG. 14C is a cross-sectional view of the six-wheel bionic chassis along B-B line segment of FIG. 14B in another embodiment disclosed by the present invention. In this embodiment, the difference between the aforementioned FIG. 13A to FIG. 13D is that the front wheel suspension assembly 70 of the six-wheel bionic chassis 3 further has a front wheel suspension fixing seat and a front wheel auxiliary wheel-lifting spring assembly, the middle wheel suspension assembly 80 further has a middle wheel suspension fixing seat, and the rear wheel suspension assembly 90 further has a rear wheel suspension fixing seat, in which the structures and the functions of these elements will be described below in detail.

In FIG. 14A and FIG. 14B, the six-wheel bionic chassis 4 is at least composed by a chassis frame 60, a front wheel suspension assembly 70, a middle wheel suspension assembly 80 and a rear wheel suspension assembly 90, in which the chassis frame 60 includes an upper surface and a bottom surface, and the bottom surface is a surface faced along a ground direction. Thus, the front wheel suspension assembly 70, the middle wheel suspension assembly 80 and the rear wheel suspension assembly 90 are arranged at the surface faced to the ground, the front wheel suspension assemblies 70 are arranged at both sides (right side of FIG. 14A and FIG. 14B) of the chassis frame 60, the middle wheel suspension assemblies 80 are arranged between the front end and the rear end of the chassis frame 60, and the rear wheel suspension assemblies 90 are arranged at both sides (left side of the FIG. 14A and FIG. 14B) of the rear end of the chassis frame 60. The front wheel suspension assembly 70, the middle wheel suspension assembly 80 and the rear wheel suspension assembly 90 are further pivotally connected to a front wheel set 718, a middle wheel set 814 and a rear wheel set 914, respectively. It should be added that the middle wheel suspension assembly 80 can be arranged at middle of the chassis frame 60, a position near the front end of the chassis frame 60 or near the rear end of the chassis frame 60 according to user's design.

FIG. 14C is a cross-sectional view along B-B line segment of FIG. 14B. The front wheel suspension assemblies 70, the middle wheel suspension assemblies 80 and rear wheel suspension assemblies 90 are lateral symmetry and arranged at the chassis frame 60, so the six-wheel bionic chassis 4 described below will be explained by a single front wheel suspension assembly 70, a single middle wheel suspension assembly 80 and a single rear wheel suspension assembly 90. In addition, the arrow M indicates the traveling direction of the six-wheel bionic chassis 4 in FIG. 14A to FIG. 14C.

Likewise, the same as the description above, when the six-wheel bionic chassis 4 disclosed by the present invention is encountering a vertical obstacle (not shown), the front wheel suspension assembly 70, the middle wheel suspension assembly 80 and the rear wheel suspension assembly 90 have compression heights and compression strokes respectively in which the compression heights are the height H (as shown in FIG. 14C) between top of the steering mechanism (such as the front wheel steering mechanism 714, the middle wheel steering mechanism 810 or the rear wheel steering mechanism 910) and bottom of the wheel sets (such as the front wheel set 718, the middle wheel set 814 or the rear wheel set 914). In a preferred embodiment, the compression heights H between the front wheel steering mechanism 714, the middle wheel steering mechanism 810 or the rear wheel steering mechanism 910 and the front wheel set 718, the middle wheel set 814 or the rear wheel set 914 are 300 mm. In addition, the compression strokes of the front wheel steering mechanism 714, the middle wheel steering mechanism 810 or the rear wheel steering mechanism 910 refer the heights at which the front wheel steering mechanism 714, the middle wheel steering mechanism 810 or the rear wheel steering mechanism 910 respectively lift the front wheel set 718, the middle wheel set 814 or the rear wheel set 914 from the ground. In a preferred embodiment, the compression strokes range from 0 to 200 mm. Thus, when the six-wheel bionic chassis 4 encounters a vertical obstacle and the height of the vertical obstacle cannot be crossed by lifting the front wheel set 718 of the six-wheel bionic chassis 4, at this time the pressing forces produced from the middle wheel set 814 and the rear wheel set 914 can compress the front wheel suspension assembly 70, so to cross the vertical obstacle through lifting the front wheel upper supporting arm set 708 driven by the front wheel auxiliary wheel-lifting supporting frame 704 and the front wheel steering mechanism 712 of the front wheel linkage mechanism. The two ends of the middle wheel upper supporting arm set 804 of the middle wheel suspension assembly 80 are respectively hinged to the chassis frame 60 and the middle wheel steering mechanism 808, and the two ends of the rear wheel upper supporting arm set 904 of the rear wheel suspension assembly 90 are respectively hinged to the chassis frame 60 and the rear wheel steering mechanism 908. Thus, the middle wheel upper supporting arm set 804 and the rear wheel upper supporting arm set 904 can not only move along Y direction but also move along Z direction, such as motions of arthropod's legs. The middle wheel upper supporting arm set 804 and the rear wheel upper supporting arm set 904 can respectively move along different directions, so the middle wheel upper supporting arm set 804 and the rear wheel upper supporting arm set 904 can respectively drive the middle wheel steering supporting frame 708 and the rear wheel steering supporting frame 808 to cross the obstacle by lifting the middle wheel set 814 and the rear wheel set 914.

Figure 15A:
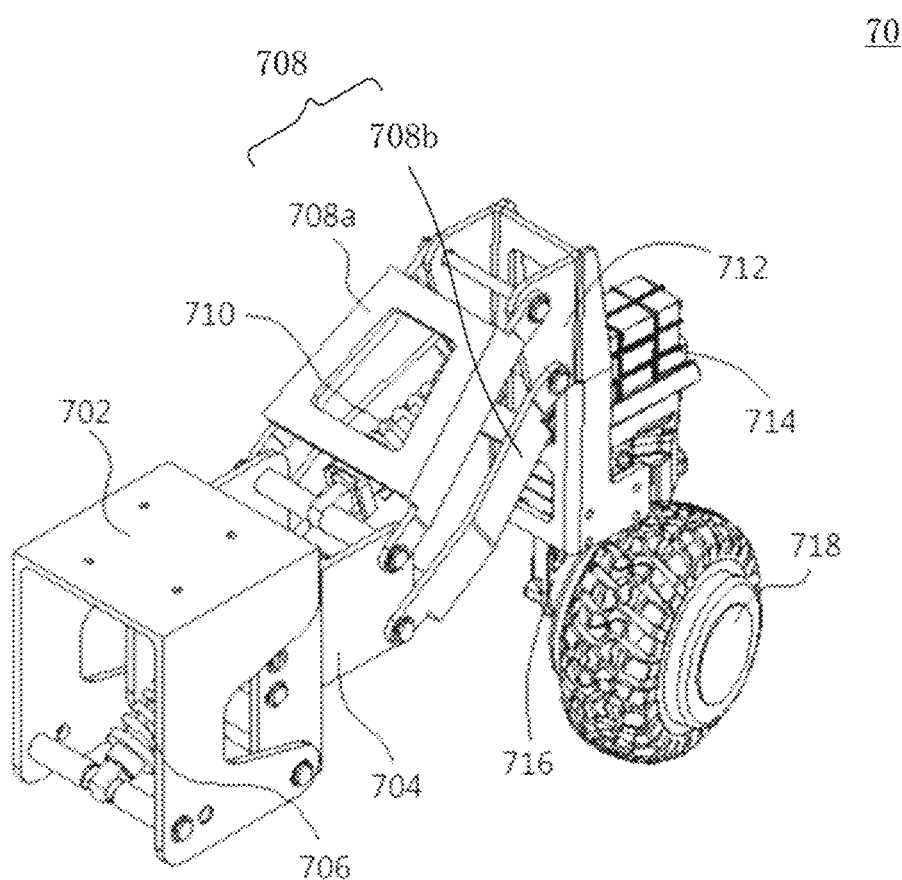
FIG. 15A is a structural schematic view of a front wheel suspension assembly of a six-wheel bionic chassis in accordance with the present invention.
Figure 15B:
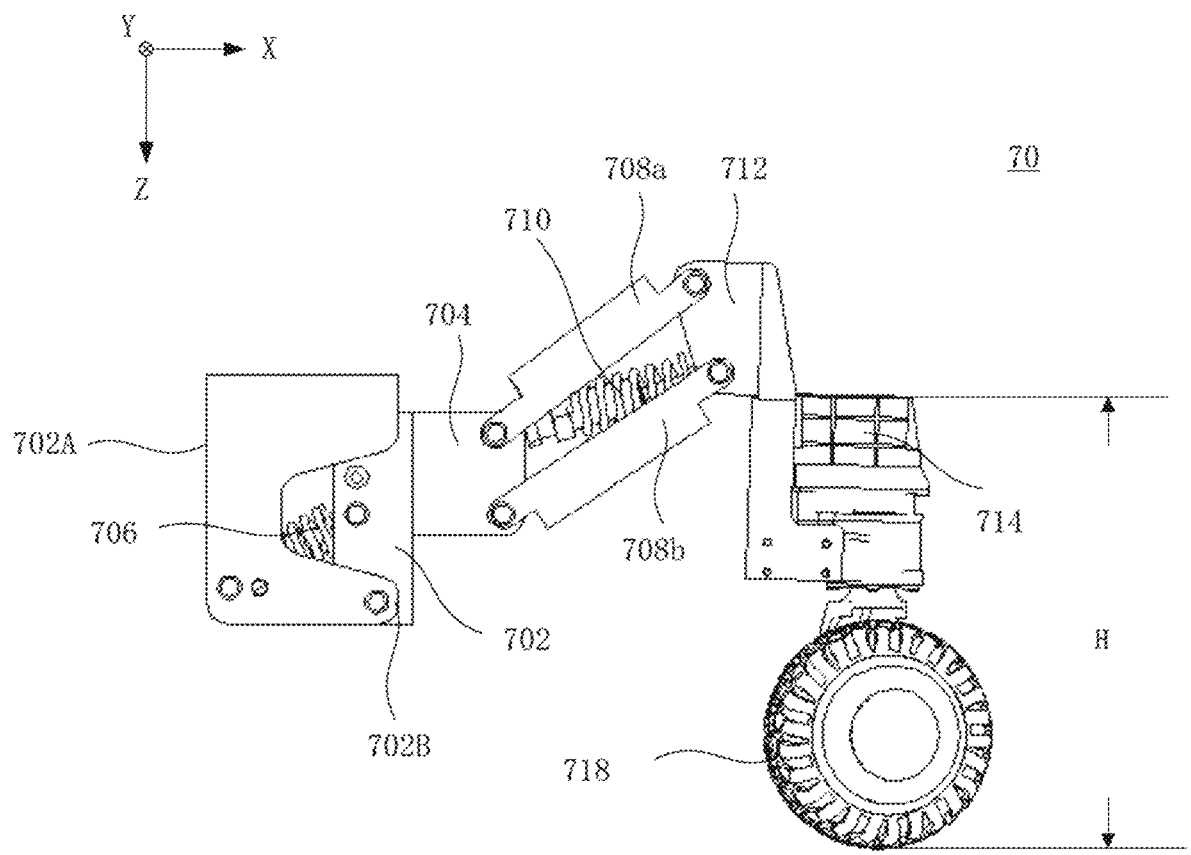
FIG. 15B is a side view of the front wheel suspension assembly in accordance with the present invention.

Please refer to FIG. 15A and FIG. 15B. FIG. 15A is a schematic view of the front wheel suspension assembly of the six-wheel bionic chassis disclosed by the present invention, and FIG. 15B is a side view of the front wheel suspension assembly. In FIG. 15A and FIG. 15B, the front wheel suspension assembly 70 at least includes a front wheel suspension fixing seat 702, a front wheel auxiliary supporting frame 704, a front wheel auxiliary wheel-lifting spring assembly 706, a front wheel upper supporting arm set 708, a front wheel suspension spring assembly 710, a front wheel steering supporting frame 712, a front wheel steering mechanism 714, a front wheel hub motor 716 and a front wheel set 708, in which one end 702A of the front wheel suspension fixing seat 702 is fixedly connected to the front end of the chassis frame 60, and one end of the front wheel auxiliary supporting frame 704 is hinged to the other end 702B of the front wheel suspension fixing seat 702. One end of the front wheel auxiliary wheel-lifting spring assembly 706 is passed through and arranged at the front wheel suspension fixing seat 702, the front wheel auxiliary wheel-lifting spring assembly 706 is also hinged to the front wheel suspension fixing seat 702, and the other end of the front wheel auxiliary wheel-lifting spring assembly 706 is hinged to the other end of the front wheel auxiliary wheel-lifting supporting frame 704. The front wheel upper supporting arm set 708 is composed by a first front wheel upper supporting arm 708*a* and a pair of second front wheel upper supporting arms 708*b*, in which one end of the first front wheel upper supporting arm 708*a* is hinged to the other end of the front wheel auxiliary wheel-lifting supporting frame 704, and the other end of the first front wheel upper supporting arm 708*a* is hinged to the front wheel steering supporting frame 712. The pair of the second front wheel upper supporting arms 708*b* are arranged at both sides of the front wheel auxiliary wheel-lifting supporting frame 704, in which one ends of the second front wheel upper supporting arms 708*b* are hinged to the front wheel auxiliary wheel-lifting supporting frame 704, and the other ends of the second front wheel upper supporting arms 708*b* are hinged to the front wheel steering supporting frame 712. Therein, the arranging method of the first front wheel upper supporting arm 708*a* which arranged at the front wheel auxiliary wheel-lifting supporting frame 704 and the front wheel steering supporting frame 708*a* is that the first front wheel upper supporting arm 708*a* is arranged above the second front wheel upper supporting arms 708*b*.

In addition, in a preferred embodiment of the present invention, the first front wheel upper supporting arm 708*a* has an inverted U-shaped structure, and the two sides of the inverted U-shaped structure are extended outward to separately hinged to the front wheel auxiliary wheel-lifting supporting frame 704 and the front wheel steering supporting frame 712. The second front wheel upper supporting arms 708*b* are a pair of rectangular ribs, and the second front wheel upper supporting arms 708*b* are respectively arranged at both sides of the front wheel auxiliary wheel-lifting supporting frame 704 and the front wheel steering supporting frame 712. The objective of the front wheel upper supporting arm set 708 is used to connect to the front wheel auxiliary wheel-lifting supporting frame 704 and the front wheel steering supporting frame 712. The two ends of the front wheel upper supporting arm set 708 are respectively hinged to the front wheel auxiliary wheel-lifting supporting frame 704 and the front wheel steering supporting frame 712, so the front wheel auxiliary wheel-lifting supporting frame 704 and the front wheel steering supporting frame 712 can adjust the heights by the front wheel upper supporting arm set 708 according to the heights of the six-wheel bionic chassis 3 (as shown in FIG. 13A) or 4 (as shown in FIG. 14A). The two ends of the front wheel suspension spring assembly 710 are respectively hinged to two ends of the first front wheel upper supporting arm 708*a* and the second front wheel upper supporting arms 708*b*. One end of the front wheel steering supporting frame 714 is fixedly connected to the front wheel steering mechanism 714, the other end faced along a ground direction of the front wheel steering mechanism 714 is pivotally connected to the front wheel set 718, and the front wheel set 718 is pivotally connected to the front wheel hub motor 716. According to the above, a front wheel linkage mechanism is constituted by the front wheel upper supporting arm set 708, the front wheel auxiliary wheel-lifting supporting frame 704 and the front wheel steering supporting frame 712 of the front wheel suspension assembly 70, so the six-wheel bionic chassis 3 or 4 can control a movement trajectory through the front wheel linkage mechanism when the front wheel set 718 encounters a vertical obstacle.

Figure 16:
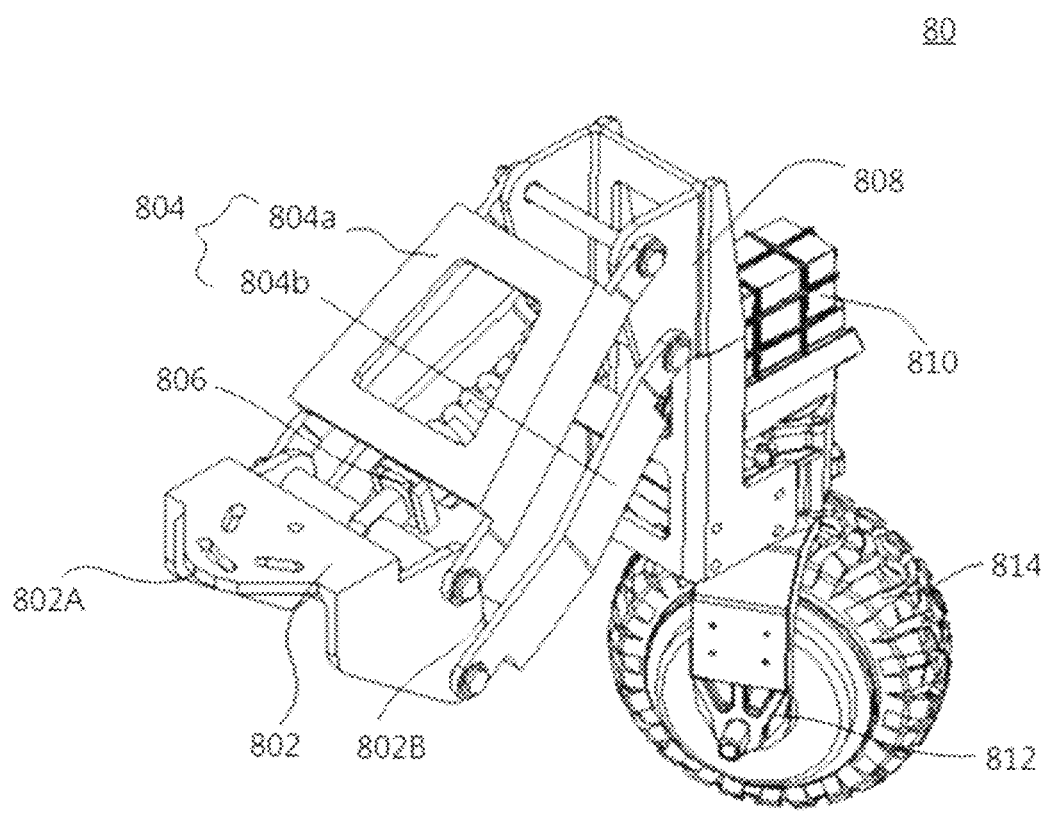
FIG. 16 is a structural schematic view of a middle wheel suspension assembly of a six-wheel bionic chassis in accordance with the present invention.

Please refer to FIG. 16. FIG. 16 is a structural view of the middle wheel suspension assembly of the six-wheel bionic chassis. In FIG. 16, the middle wheel suspension assembly 80 at least includes a middle wheel suspension fixing seat 802, a middle wheel upper supporting arm set 804, a middle wheel suspension spring assembly 806, a middle wheel steering supporting frame 808, a middle wheel steering mechanism 810, a middle wheel hub motor 812 and a middle wheel set 814, in which one end 802A of the middle wheel suspension fixing seat 802 is fixedly connected to middle of the chassis frame 60. The middle wheel upper supporting arm set 804 is composed by a first middle wheel upper supporting arm 804*a* and a pair of second middle wheel upper supporting arms 804*b*, one end of the first middle wheel upper supporting arm 804*a* is hinged to the other end 802B of the middle wheel suspension fixing seat 802, and the other end of the first middle wheel upper supporting arm 804*a* is hinged to the middle wheel steering supporting frame 808. One ends of the second middle wheel upper supporting arms 804*b* are hinged to the other end 802B of the middle wheel suspension fixing seat 802, and the other ends of the second middle wheel upper supporting arms 804*b* are hinged to the middle wheel steering supporting frame 808, in which the first middle wheel upper supporting arm 804*a* is arranged above the second middle wheel upper supporting anus 804*b*.

In addition, in a preferred embodiment, in the same way as the front wheel upper supporting arm set 708, the first middle wheel upper supporting arm 804*a* has an inverted U-shaped structure, and the two sides of the inverted U-shaped structure are extended outward to separately hinge to the middle wheel suspension fixing seat 802 and the middle wheel steering supporting frame 808. The second middle wheel upper supporting arms 804*b* are a pair of rectangular ribs, in which the second middle wheel upper supporting arms 804*b* are respectively arranged at both sides of the middle wheel suspension fixing seat 802 and the middle wheel steering supporting frame 808, and the second middle wheel upper supporting arms 804*b* are arranged below the first middle wheel upper supporting arm 804*a*. The objective of the middle wheel upper supporting arm set 804 is used to connect to the middle wheel suspension fixing seat 802 and the middle wheel steering supporting frame 808. One end of the middle wheel steering supporting frame 808 is fixedly connected to the middle wheel steering mechanism 810, the other end faced along a ground direction of the middle wheel steering supporting frame 808 is pivotally connected to the middle wheel set 814, and the middle wheel set 814 is pivotally connected to the middle wheel hub motor 812. According to the above, a middle wheel linkage mechanism is constituted by the middle wheel upper supporting arm set 804 and the middle wheel steering supporting frame 808 of the middle wheel suspension assembly 80, so the six-wheel bionic chassis 3 or 4 can control a movement trajectory of the middle wheel set 814 through the middle wheel linkage mechanism when the middle wheel set 814 encounters a vertical obstacle.

Figure 17:
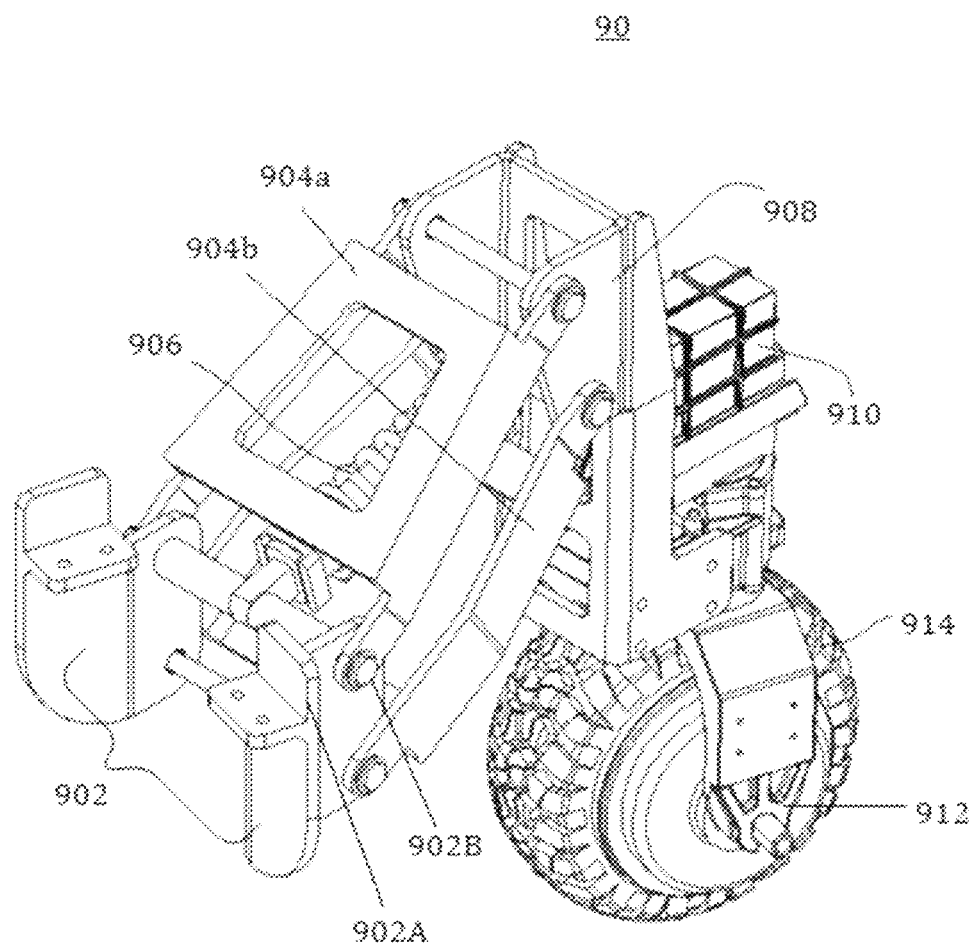
FIG. 17 is a structural schematic view of a rear wheel suspension assembly of a six-wheel bionic chassis in accordance with the present invention.

Please refer to FIG. 17. FIG. 17 is a structural view of a rear wheel suspension assembly of the six-wheel bionic chassis. In FIG. 17, the rear wheel suspension assembly 90 at least includes a rear wheel suspension fixing seat 902, a rear wheel upper supporting arm set 904, a rear wheel suspension spring assembly 906, a rear wheel steering supporting frame 908, a rear wheel steering mechanism 910, a rear wheel hub motor 912 and a rear wheel set 914, in which one end 902A of the rear wheel suspension fixing seat 902 is fixedly connected to the rear end of the chassis frame 60. The rear wheel upper supporting arm set 904 is composed by a first rear wheel upper supporting arm 904a and a pair of the second rear wheel upper supporting arms 904b, one end of the first rear wheel upper supporting arm 904a is hinged to the other end 902B of the rear wheel suspension fixing seat 902, the other end of the first rear wheel upper supporting arm 904a is hinged to the rear wheel steering supporting frame 908, one ends of the second rear wheel upper supporting arms 904b are hinged to the other end 902B of the rear wheel suspension fixing seat 902, and the other ends of the second rear wheel upper supporting arms 904b are hinged to the rear wheel steering supporting frame 908, in which the first rear wheel upper supporting arm 904a is arranged above the second rear wheel upper supporting arms 904b.

In addition, in a preferred embodiment, the first rear wheel upper supporting arm 904a has an inverted U-shaped structure, in which two ends of the inverted U-shaped structure extended outward from the first rear wheel upper supporting arm 904a are respectively hinged to the rear wheel suspension fixing seat 902 and the rear wheel steering supporting frame 908. The second rear wheel upper supporting arms 904b are a pair of rectangular ribs, in which the second rear wheel upper supporting arms 904b are arranged at both sides of the rear wheel suspension fixing seat 902 and the rear wheel steering supporting frame 908, and the second rear wheel upper supporting arms 904b are arranged below the first rear wheel upper supporting arm 904a. The objective of the rear wheel upper supporting arm set 904 is used to connect to the rear wheel suspension fixing seat 902 and the rear wheel steering supporting frame 908. One end of the rear wheel steering supporting frame 908 is fixedly connected to the rear wheel steering mechanism 910, the other end faced along a ground direction of the rear wheel steering mechanism 910 are pivotally connected to the rear wheel set 914, and the rear wheel set 914 is pivotally connected to the rear wheel hub motor 912. According to the above, a rear wheel linkage mechanism is constituted by the rear wheel upper supporting arm set 904 and the rear wheel steering supporting frame 908 of the rear wheel suspension assembly 90, so the six-wheel bionic chassis 3 or 4 can control a movement trajectory of the rear wheel set 914 through the rear wheel linkage mechanism when the rear wheel set 914 encounters a vertical obstacle.

It should be added that the front wheel hub motor 716 of the front wheel suspension assembly 70, the middle wheel hub motor 812 of the middle wheel suspension assembly 80 and the rear wheel hub motor 912 of the rear wheel suspension assembly 90 of the six-wheel bionic chassis 3, 4 disclosed by the present invention are respectively used to drive the front wheel set 718, the middle wheel set 814 and the rear wheel set 914 to rotate. In addition, the six-wheel bionic chassis 3, 4 further include sensors (not shown) to detect positions and the speed of the front wheel set 718, the middle wheel set 814 and the rear wheel set 914 and the heights between the front wheel set 718, the middle wheel set 814, the rear wheel set 914 and the horizontal plane. Furthermore, the sensors can also simultaneously monitor the current positions of the front wheel steering mechanism 714, the middle wheel steering mechanism 810 and the rear wheel steering mechanism 910 and the suspension assembly 70, the middle wheel suspension assembly 80 and the rear wheel suspension assembly 90. Besides, the six-wheel bionic chassis 3, 4 include controllers (not shown) to receive the positions and the speed of the front wheel set 718, the middle wheel set 814 and the rear wheel set 914, and the heights between the front wheel set 718, the middle wheel set 814, the rear wheel set 914 and the horizontal plane detected by the sensors, so to respectively control the steering of the front wheel set 718, the middle wheel set 814 and the rear wheel set 914, and the suspension heights of the front wheel suspension assembly 70, the middle wheel suspension assembly 80 and the rear wheel suspension assembly 90.

Figure 18A:
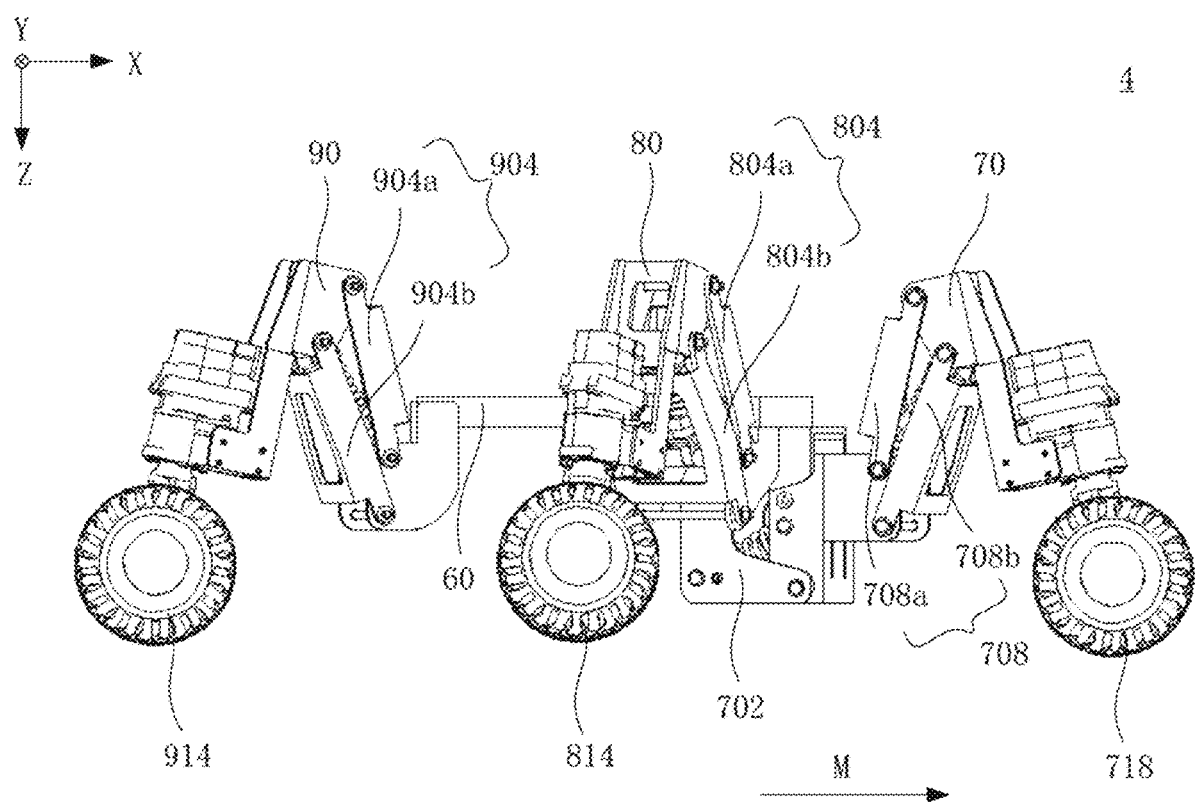
FIG. 18A is a structural schematic view of a six-wheel bionic chassis moving down in accordance with the present invention.
Figure 18B:
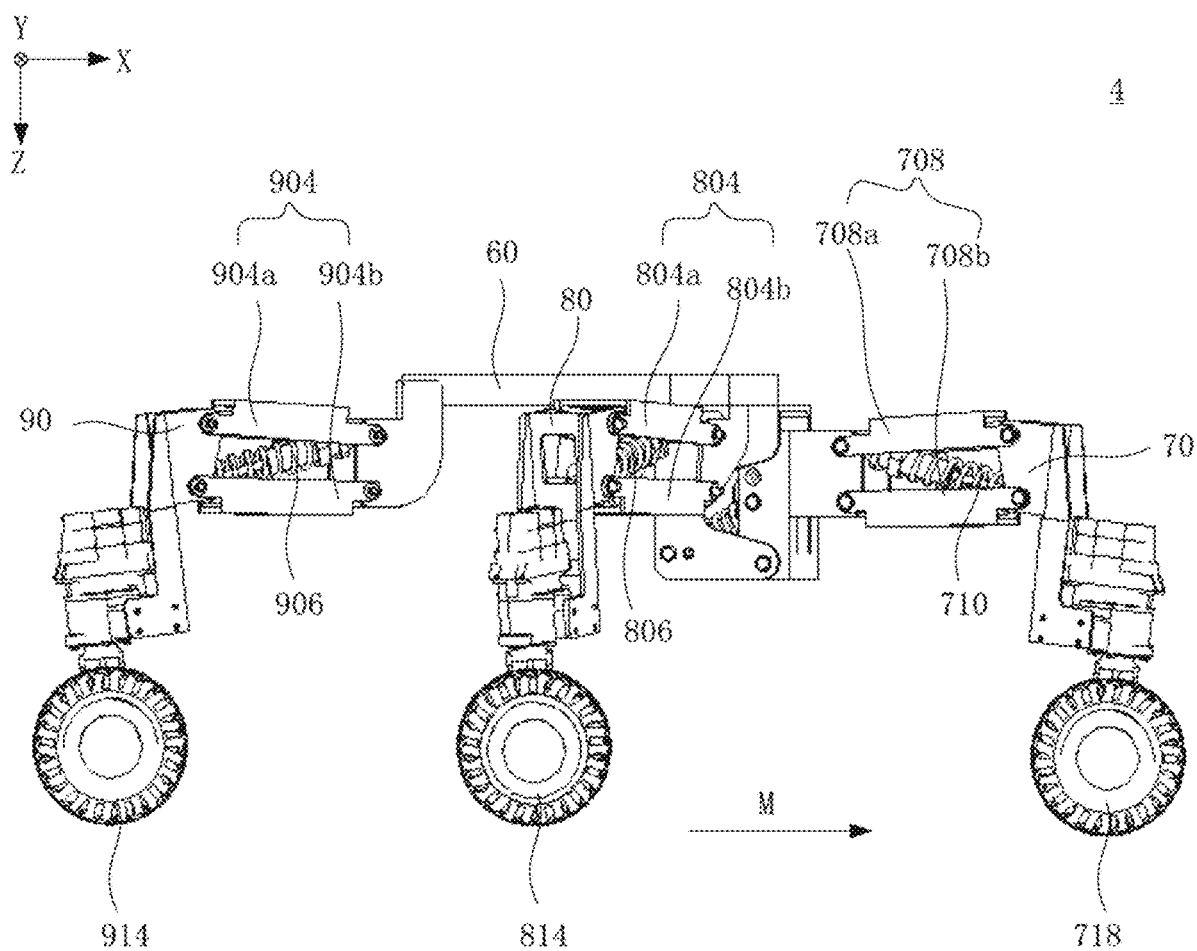
FIG. 18B is a structural schematic view of a six-wheel bionic chassis moving up in accordance with the present invention.

Thus, according to the above, when the six-wheel bionic chassis 3 or 4 disclosed by the present invention encounter a vertical obstacle (not shown), the front wheel suspension assembly 70, the middle wheel suspension assembly 80 and the rear wheel suspension assembly 90 can drive the front wheel set 718, the middle wheel set 814 and the rear wheel set 914 to respectively produce 200 mm movement strokes up and down. Therefore, when the six-wheel bionic chassis 3, 4 encounter a vertical obstacle and the height of the vertical obstacle cannot be crossed by lifting the front wheel set 718 of the six-wheel bionic chassis 3, 4, at this time the pressing forces produced from the middle wheel set 814 and the rear wheel set 914 can compress the front wheel auxiliary wheel-lifting spring assembly 706 of the front wheel suspension assembly 70, so to cross the vertical obstacle through lifting the front wheel upper supporting arm set 708. The obstacle crossing process of the six-wheel bionic chassis 3, 4 will be describe below in detail. Besides, when the six-wheel bionic chassis 3, 4 are crossing the obstacle, the front wheel suspension spring assembly 710 of the front wheel suspension assembly 70, the middle wheel suspension spring assembly 806 of the middle wheel suspension assembly 80 and the rear wheel suspension spring assembly 906 of the rear wheel suspension assembly 90 can drive the middle wheel set 814 and the rear wheel set 914 to produce 300 mm obstacle crossing height of movement strokes. As shown in FIG. 18A, FIG. 18A shows that the front wheel suspension spring assembly 710, the middle wheel suspension spring assembly 806 and the rear wheel suspension spring assembly 906 of the six-wheel bionic chassis 3, 4 have downward (faced along a ground direction) compression strokes ranges from 0 to 200 mm. In FIG. 18B, the front wheel suspension spring assembly 710, the middle wheel suspension spring assembly 806 and the rear wheel suspension spring assembly 906 of the six-wheel bionic chassis 3, 4 are lifted upward to 300 mm height. Thus, the six-wheel bionic chassis 3, 4 at least have ±200 mm height of damping strokes.

Therefore, according to the above, when the compression height of the wheel sets (the front wheel set 718, the middle wheel set 814 and the rear wheel set 914) are larger, the flexibility of the suspension spring assemblies (the front wheel suspension assembly 70, the middle wheel suspension assembly 80 and the rear wheel suspension assembly 90) are better, and the compression strokes of the suspension assemblies (the front wheel suspension assembly 70, the middle wheel suspension assembly 80 and the rear wheel suspension assembly 90) are larger, so the obstacle crossing ability of the six-wheel bionic chassis 3, 4 are better.

It should be added that the suspension damping devices (such as FIG. 1 to FIG. 10) or the suspension assemblies (such as FIG. 11A to FIG. 11B and FIG. 12A to FIG. 12B) described above can also be installed at the six-wheel bionic chassis 3, 4, so the suspension damping devices (such as FIG. 1 to FIG. 10) or the suspension assemblies (such as FIG. 11A to FIG. 11B and FIG. 12A to FIG. 12B) described above can be respectively used as the suspension damping devices or the suspension assemblies of the front wheel, the middle wheel or the rear wheel. The six-wheel bionic chassis (not shown) which includes the suspension damping devices (such as FIG. 1 to FIG. 10) or the suspension assemblies (such as FIG. 11A to FIG. 11B and FIG. 12A to FIG. 12B) has turning direction, slope climbing or obstacle crossing functions which is the same as the six-wheel bionic chassis 3, 4 described in aforementioned embodiments, so the contents of the suspension damping devices (such as FIG. 1 to FIG. 10) or the suspension assemblies (such as FIG. 11A to FIG. 11B and FIG. 12A to FIG. 12B) combined with the chassis will not describe herein.

Figure 19:
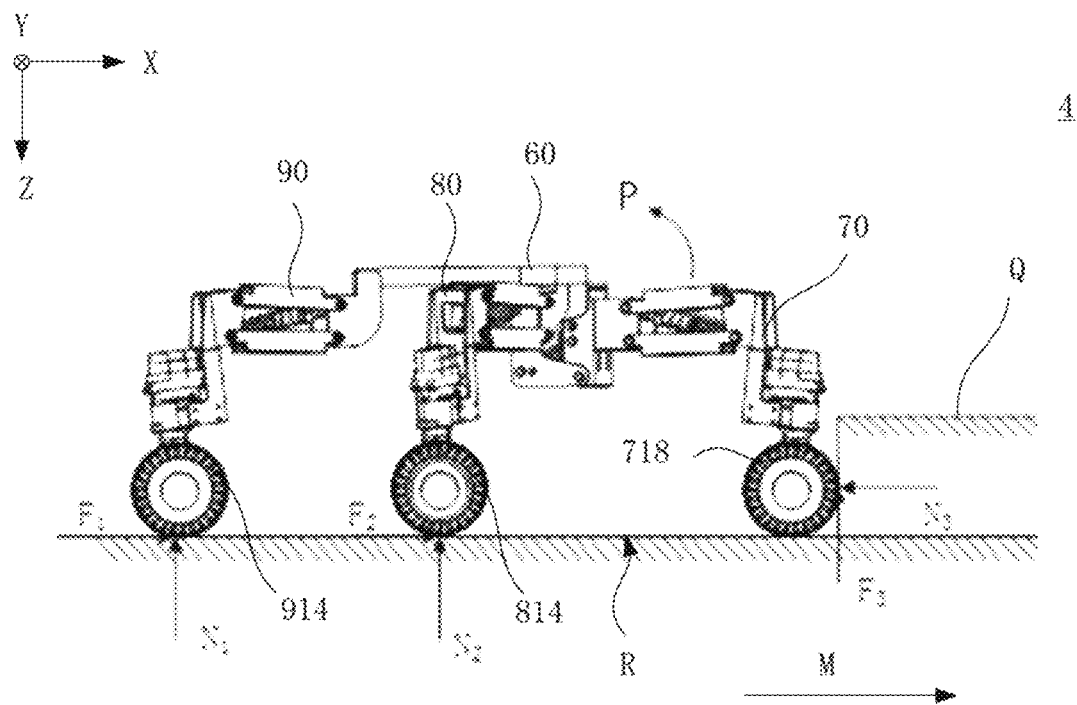
FIG. 19 is a schematic view of a six-wheel bionic chassis when crossing an obstacle in an embodiment in accordance with the present invention.

Please refer to FIG. 19. FIG. 19 is a schematic view of a six-wheel bionic chassis when crossing an obstacle in an embodiment in accordance with the present invention. When refer to FIG. 19, please also simultaneously refer to FIG. 15. FIG. 16 and FIG. 17. In FIG. 19, the six-wheel bionic chassis 3, 4 operate stably at a first peak torque which is 10 N·m when move on a plane. When the sensors detect that the front wheel set 718 encounters a vertical obstacle Q, the sensors send obstacle signals to the controller. The controller sends controlling signals to the front wheel hub motor 716, the middle wheel hub motor 812 and the rear wheel hub motor 912 to operate at a second peak torque which is 13 N·m. At this time, the front wheel set 718 is subjected to a reaction force $N_3$ acted from the vertical obstacle Q and a friction force $F_3$ acted between the front wheel set 718 and the plane 30, and the front wheel suspension spring assembly 710 is compressed by a resultant force of the reaction force $N_3$ and the friction force $F_3$. In detail, the front wheel set 718 is subjected to the resultant force of the reaction force $N_3$ acted from the vertical obstacle Q and the friction force $F_3$ acted between the front wheel set 718 and the plane 30 to compress the front wheel suspension spring assembly 710 and the front wheel auxiliary wheel-lifting spring assembly 706 of the front wheel suspension assembly 70. The front wheel suspension assembly 70 can drive the front wheel set 718 to move along a P direction, and the front wheel set 718 can be lifted to cross the vertical obstacle Q, so to reach the objective of crossing obstacles.

After the front wheel set 718 crosses the obstacle, the six-wheel bionic chassis 3, 4 keep moving forward (along a direction of an arrow M shown in FIG. 19), and the controller sends a signal to control the front wheel hub motor 716 to operate at the first peak torque which is 10 N·m. When the six-wheel bionic chassis 3, 4 keep moving forward and the sensors sense that the middle wheel set 814 encounters the vertical obstacle Q, the sensors send obstacle signals to the controller again, and the controller sends control signals to the middle wheel hub motor 812 to operate at the second peak torque which is 13 N·m after the controller receives the obstacle signals. At this time, the middle wheel set 814 is subjected to a reaction force $N_2$ acted from the vertical obstacle Q and a friction force F2 acted between the middle wheel set 814 and the plane 30, and the middle wheel suspension spring assembly 806 is compressed by a resultant force of the reaction force $N_2$ and the friction force F2. In detail, the middle wheel set 814 is subjected to the resultant force of the reaction force $N_2$ acted from the vertical obstacle Q and the friction force F2 acted between the middle wheel set 814 and the plane 30 to compress the middle wheel suspension spring assembly 806 of the middle wheel suspension assembly 80, and the middle wheel suspension assembly 80 can also drive the middle wheel set 814 to move along the P direction. The middle wheel set 814 can cross the vertical obstacle Q in a passive way with the help of traction force and the motive force itself, so to let the middle wheel set 814 reach the objective of crossing obstacles.

After the six-wheel bionic chassis 3,4 complete that the front wheel set 718 and the middle wheel set 814 cross the vertical obstacle Q, the front wheel hub motor 716, the middle hub motor 812 and rear wheel hub motor 912 operate at the first peak torque which is 10 N·m to drive the front wheel set 718, the middle wheel set 814 and the rear wheel set 914 to move forward (along the arrow M shown in FIG. 19). When the rear wheel set 914 encounters the vertical obstacle Q, the sensors send the obstacle signals to the controller again. After the controller receives the obstacle signals, the controller sends the controlling signal to the rear wheel hub motor 912 to operate at the second peak torque which is 13 N·m. At this time, the rear wheel set 914 is subjected to a reaction force $N_1$ acted from the vertical obstacle Q and a friction force $F_1$ acted between the rear wheel set 914 and the plane 30, so the rear wheel suspension spring assembly 906 is compressed by a resultant force of the reaction force $N_1$ and the friction force $F_1$. In detail, the rear wheel set 914 is subjected to the resultant force of the reaction force $N_1$ acted from the vertical obstacle Q and the friction force $F_1$ acted between the rear wheel set 914 and the plane 30 to compress the rear wheel suspension spring assembly 906 of the rear wheel suspension assembly 90, and the rear wheel suspension assembly 90 can drive the rear wheel set 914 to move along the P direction. The rear wheel set 914 can cross the vertical obstacle Q in a passive way with the help of traction force and the motive force itself, so to let the rear wheel set 914 reach the objective of crossing obstacles. After the six-wheel bionic chassis 3, 4 complete that the front wheel set 718, the middle wheel set 814 and the rear wheel set 914 of the cross the vertical obstacle Q, the controller sends signals to change the front wheel hub motor 716, the middle wheel hub motor 812 and the rear wheel hub motor 912 of the six-wheel bionic chassis 3, 4 from the second peak torque which is 13 N·m to the first peak torque which is 10 N·m, so to drive the front wheel set 718, the middle wheel set 814 and the rear wheel set 914 to move forward (along the arrow of M shown in FIG. 19). It should be added that when the six-wheel bionic chassis 3, 4 adjusts the toughness of the front wheel suspension assembly 70, the middle wheel suspension assembly 80 and the rear wheel suspension assembly 90, the compression strokes from the front wheel suspension assembly 70, the middle wheel suspension assembly 80 and the rear wheel suspension assembly 90 to the front wheel set 718, the middle wheel set 814 and the rear wheel set 914 range from 0 to 200 mm. Thus, the six-wheel bionic chassis 3.4 can reach the objective of crossing obstacles with the compression strokes of 300 mm. The calculation process will describe below in detail.

Figure 20:
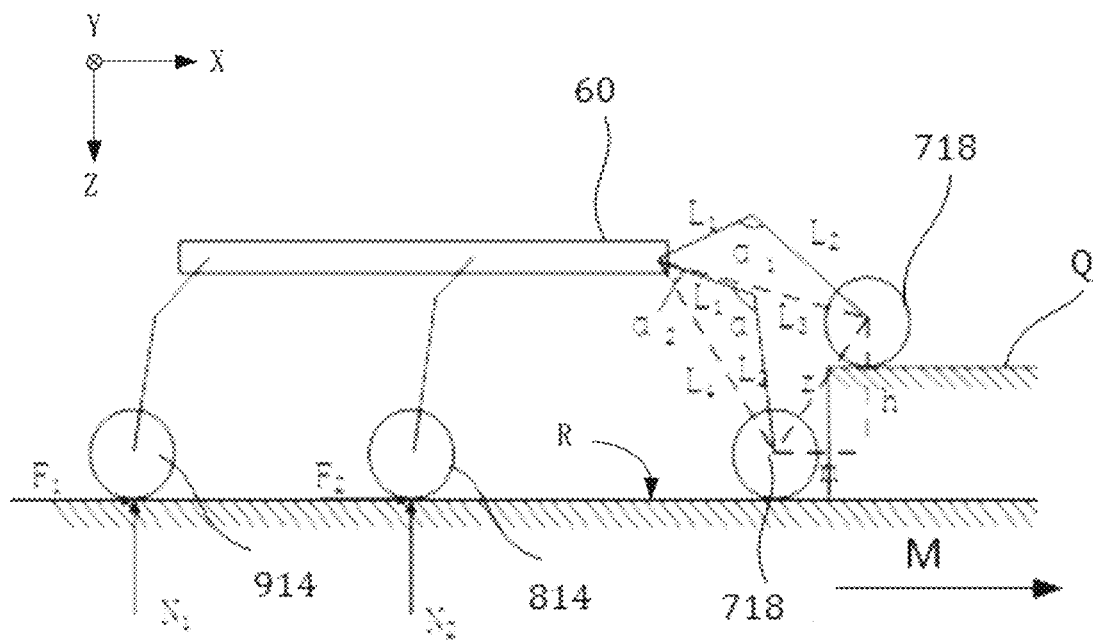
FIG. 20 is a schematic view of calculating a height of crossing an obstacle of a six-wheel bionic chassis in accordance with the present invention.

The factors which influence the obstacle-crossing height of the six-wheel bionic chassis 3, 4 may include: the positions of the gravity center of the six-wheel bionic chassis 3, 4, the hub motors (such as the front wheel hub motor 716, the middle wheel hub motor 812 and the rear wheel hub motor 912), and the friction coefficients between the wheel sets (such as the front wheel set 718, the middle wheel set 814 and the rear wheel set 914) and the ground. Therein, the positions of the gravity center of the six-wheel bionic chassis 3, 4 relates to the structure factors of the chassis frame 60, in which the structure factors include the diameter of the wheel sets (such as the front wheel set 718, the middle wheel set 814 and the rear wheel set 914), the elasticity of the damping structures, and the suspension strokes. As shown in FIG. 20, under a hypothesis that the hub motors (such as the front wheel hub motor 716, the middle wheel hub motor 812 and the rear wheel hub motor 912) have enough power, when the wheel sets (such as the front wheel set 718, the middle wheel set 814 and the rear wheel set 914) are rolling on the ground, the calculation method of the obstacle-crossing height h of the six-wheel bionic chassis 3, 4 is described below:

$$L_1^2 + L_2^2 - 2L_1L_2\cos\alpha_1 = L_3^2 \quad (1)$$

$$L_1^2 + L_2^2 - 2L_1L_2\cos\alpha = L_4^2 \quad (2)$$

$$Z^2 = L_3^2 + L_4^2 - 2L_3L_4\cos\alpha_2 \quad (3)$$

$$z^2 - m^2 = h^2 \quad (4)$$

According to function (1) to function (4), the obstacle-crossing height h can be calculated as follows:

$$h = \sqrt{L_1^2 + L_2^2 - 2L_1L_2\cos\alpha_1 + L_1^2 + L_2^2 - 2L_1L_2\cos\alpha - 2\sqrt{L_1^2 + L_2^2 - 2L_1L_2\cos\alpha_1}\sqrt{L_1^2 + L_2^2 - 2L_1L_2\cos\alpha}\cos\alpha_2 - m^2}, \quad (5)$$

where $L_1$ is a length of each of the upper supporting arm set, $L_2$ is a length of each of the steering supporting frame, $L_3$ is a distance between the center of each of the wheel set (such as the front wheel set 718, the middle wheel set 814 and the rear wheel set 914) when the obstacle crossing is completed and each of the suspension fixing seat (such as the front wheel suspension fixing seat 702, the middle wheel suspension fixing seat 802 and the rear wheel suspension fixing seat 902), $L_4$ is a distance between center of each of the wheel set (such as the front wheel set 718, the middle wheel set 814 and the rear wheel set 914) and each of the relative suspension fixing seat (such as the front wheel suspension fixing seat 702, the middle wheel suspension fixing seat 802 and the rear wheel suspension fixing seat 902) when the six-wheeled bionic chassis 3, 4 are moving on a plane, m is a moving distances of each of the wheel set (such as the front wheel set 718, the middle wheel set 814 and the rear wheel set 914) which before crossing the obstacle and after crossing the obstacle along a horizontal direction, and z is a linear distance of each of the center of the wheel set (such as the front wheel set 718, the middle wheel set 814 and the rear wheel set 914) that before crossing the obstacle and after crossing the obstacle. According to the functions described above, the front wheel set 718, the middle wheel set 814 and the rear wheel set 914 can be calculated to obtain a resultant force of forward forces from six different positions of the six-wheel bionic chassis 3, 4, so to obtain the obstacle crossing height of the six-wheel bionic chassis 3, 4.

The structures of the front wheel suspension assembly 70, the middle wheel suspension assembly 80 and the rear wheel suspension assembly 90 of the six-wheel bionic chassis 3, 4 disclosed by the present invention can simulate motions of arthropod's legs, so to continuously increase the vertical obstacle crossing ability of the six-wheel bionic chassis 3, 4.

The above description is only the preferred embodiments of the present invention, which is not to limit the claim scope of the present invention. Moreover, the above description can be understood and practiced for a person skilled in the related art. Therefore, all equivalent modifications and similar arrangements within the spirit and scope disclosed by the present invention should be included into the applied claim scope.

What is claimed is:

1. A suspension assembly, comprises:
   a supporting arm set composed by a first supporting arm and a second supporting arm;
   a suspension spring assembly arranged between the first supporting arm and the second supporting arm, two ends of the suspension spring assembly are respectively hinged to two ends of the first supporting arm and the second supporting arm, wherein one of the first supporting arm or the second supporting arm has an inverted U-shape structure, the other of the first supporting arm or the second supporting arm has a pair of rectangular ribs, one of the first supporting arm and the second supporting arm is arranged above the suspension spring assembly, and one of the first supporting arm and the second supporting arm is respectively arranged at two sides of the suspension spring assembly; and
   a steering supporting frame, one end of the steering supporting frame is respectively hinged to one ends of the first supporting arm and the second supporting arm, the other end of the steering supporting frame is hinged to a steering mechanism, and one end of the steering mechanism faced to the horizontal plane is pivotally connected to a wheel set.

2. The suspension assembly of claim 1, further includes an auxiliary wheel-lifting supporting frame, the auxiliary wheel-lifting supporting frame is respectively hinged to other ends of the first supporting arm and the second supporting arm, the other end of the auxiliary wheel-lifting supporting frame is fixed to a robot or a mobile vehicle, so the auxiliary wheel-lifting supporting frame, the supporting arm set and the steering supporting frame constitute a linkage mechanism, the linkage mechanism is used to control a movement trajectory of the wheel set when the wheel set encounters a vertical obstacle.

3. The suspension assembly of claim 1, further includes a suspension fixing seat and an auxiliary wheel-lifting supporting frame, wherein and one end of the suspension fixing seat is fixed to a robot or a mobile vehicle, and one end of the auxiliary wheel-lifting supporting frame is hinged to the other ends of the suspension fixing seat.

4. The suspension assembly of claim 3, further includes an auxiliary wheel-lifting spring assembly, wherein one end of the auxiliary wheel-lifting spring assembly is passed through the suspension fixing seat and is hinged to the suspension fixing seat, and the other end of the auxiliary wheel-lifting spring assembly is hinged to the other end of the auxiliary wheel-lifting supporting frame.

5. The suspension assembly of claim 1, wherein the first supporting arm and the second supporting arm are rectangular ribs, and the first supporting arm and the second supporting arm are separately arranged at the left and right sides of the suspension spring assembly or separately arranged at the above and below the suspension spring assembly.

6. The suspension assembly of claim 1, wherein a hub motor is pivotally connected to the wheel set, and the hub motor is used to drive the wheel set.

7. The suspension assembly of claim 1, further includes a sensor and a controller, wherein the sensor is used to sense the position and velocity of the wheel set and height between the wheel set and the horizontal plane, the sensor is also used to monitor the coordinate positions of the steering mechanism and the suspension assembly, and the controller is used to receive the position and the velocity of the wheel set and the height between the wheel set and the horizontal plane which is transmitted by the sensor to separately control the steering direction of the wheel set and the suspension height of the suspension assembly.

8. The suspension assembly of claim 1, wherein a compression stroke of the suspension assembly ranges from 0 to 200 mm.

9. A six-wheel bionic chassis comprising a chassis frame, a controller, a sensor, and front wheel suspension assemblies are pivotally connected to both sides of a front end of the chassis frame toward the horizontal plane, middle wheel suspension assemblies are pivotally connected to middle two sides of the chassis frame, and rear wheel suspension assemblies are pivotally connected to both sides of a rear end of the chassis frame, the controller and the sensor are electrically connected to the front wheel suspension assemblies, the middle wheel suspension assemblies and the rear wheel suspension assemblies, comprises:
  each of the front wheel suspension assemblies, comprises:
    a front wheel auxiliary wheel-lifting supporting frame, one end of the front wheel auxiliary wheel-lifting supporting frame is hinged to the front end of the chassis frame;
    a front wheel upper supporting arm set composed by a first front wheel upper supporting arm and a pair of second front wheel upper supporting arms, the first front wheel upper supporting arm is arranged above the pair of second front wheel upper supporting arms, one end of the first front wheel upper supporting arm is hinged to the other end of the front wheel auxiliary wheel-lifting supporting frame and the other end of the first front wheel upper supporting arm is hinged to a front wheel steering supporting frame, one end of each of the second front wheel upper supporting arms is hinged to the other end of the front wheel auxiliary wheel-lifting supporting frame and the other end of each of the second front wheel upper supporting arms is hinged to the front wheel steering supporting frame;
    a front wheel suspension spring assembly, both ends of the first wheel suspension spring assembly are hinged to the both ends of the front wheel upper supporting arm set respectively; and
    the front wheel steering supporting frame, one end of the front wheel steering supporting frame is fixedly connected to a front wheel steering mechanism, one end of the front wheel steering mechanism faced to a horizontal plane direction of the is pivotally connected to a front wheel set, the front wheel set is pivotally connected to a front wheel hub motor, so the front wheel upper supporting arm set, the front wheel auxiliary wheel-lifting supporting frame and the front wheel steering supporting frame of the front steering assembly constitute a front wheel linkage mechanism to control a movement trajectory of the front wheel set when the front wheel set encounters a vertical obstacle;
  each of the middle wheel suspension assemblies, comprises:
    a middle wheel upper supporting arm set composed by a first middle wheel upper supporting arm and a pair of second middle upper supporting arms, the first middle upper supporting arm is arranged above the pair of second middle wheel upper supporting arm, one end of the middle wheel upper supporting arm is hinged to the chassis frame, the other end of the first middle upper supporting arm is hinged to a middle wheel steering supporting frame, one end of each of the second middle upper supporting arms is hinged to the chassis frame respectively, and the other end of each of the second middle upper supporting arms is hinged to the middle wheel steering supporting frame respectively;
    a middle wheel suspension spring assembly, both ends of the middle wheel suspension spring assembly are hinged to the middle wheel upper supporting arm set respectively; and
    the middle wheel steering supporting frame, one end of the middle wheel steering supporting frame is fixedly connected to the middle wheel steering mechanism and one end faced to a horizontal plane direction of the middle wheel steering mechanism is hinged to a middle wheel set, the middle wheel set is pivotally connected to a middle wheel hub motor, so the middle wheel upper supporting arm set and the middle wheel steering supporting frame of the middle wheel steering assembly constitute a middle wheel linkage mechanism to control a movement trajectory of the middle wheel set when the middle wheel set encounters a vertical obstacle; and
  each of the rear wheel suspension assemblies, comprises:
    a rear wheel upper supporting arm set composed by a first rear wheel upper supporting arm and a pair of second rear wheel upper supporting arms, the first rear wheel upper supporting arm is arranged above the pair of second rear wheel upper supporting arm, one end of the first rear wheel upper supporting arm is hinged to a rear end of the chassis frame, the other end of the first rear wheel upper supporting arm is hinged to a rear wheel steering supporting frame, one ends of each of the second rear wheel upper supporting arms is hinged to the rear end of the chassis frame respectively, and other ends of each of the second rear wheel upper supporting arms is hinged to the rear wheel steering supporting frame respectively;
    a rear wheel suspension spring assembly, both ends of the rear wheel suspension spring assembly are hinged to the rear wheel upper supporting arm respectively; and
    the rear wheel steering supporting frame, one end of the rear wheel steering supporting frame is fixedly connected to a rear wheel steering mechanism and one end faced to a horizontal plane direction of the rear wheel steering mechanism is pivotally connected to a rear wheel set, and the rear wheel set is pivotally connected to a rear wheel hub motor, so the rear wheel upper supporting arm set and the rear wheel steering supporting frame of the rear wheel steering assembly constitute a rear wheel linkage mechanism to control a movement trajectory of the rear wheel set when the rear wheel set encounters a vertical obstacle.

10. The six-wheel bionic chassis of claim 9, wherein each of the front wheel suspension assemblies further includes a front wheel suspension fixing seat and a front wheel auxiliary wheel-lifting spring assembly, one end of the front wheel suspension fixing seat is fixedly connected to the front end of the chassis frame, the other end of the front wheel suspension fixing seat is hinged to the front wheel auxiliary wheel-lifting supporting frame, one end of the front wheel auxiliary wheel-lifting spring assembly is passed through and hinged to the front wheel suspension fixing seat, and the other end of the front wheel auxiliary wheel-lifting spring assembly is hinged to the other end of the front wheel auxiliary wheel-lifting supporting frame.

11. The six-wheel bionic chassis of claim 9, wherein each of the middle wheel suspension assemblies further includes a middle wheel suspension fixing seat, one end of the middle wheel suspension fixing seat is fixedly connected to the middle of the chassis frame, the other end of the middle wheel suspension fixing seat is hinged to one end of the first middle wheel upper supporting arm, and one ends of each of the second middle wheel upper supporting arms is hinged to the other end of the middle wheel suspension fixing seat.

12. The six-wheel bionic chassis of claim 9, wherein each of the rear wheel suspension assemblies further includes a rear wheel suspension fixing seat, one end of the rear wheel suspension fixing seat is fixed to the rear end of the chassis frame, the other end of the rear wheel suspension fixing seat is hinged to one end of the first rear wheel upper supporting arm, and one ends of each of the second rear wheel upper supporting arms is hinged to the other end of the rear wheel suspension fixing seat.

13. The six-wheel bionic chassis of claim 9, wherein the front wheel hub motor, the middle wheel hub motor and the rear wheel hub motor are respectively used to drive the front wheel set, the middle wheel set and the rear wheel set to rotate.

14. The six-wheel bionic chassis of claim 9, wherein the sensor is used to sense the positions and velocities of the front wheel set, the middle wheel set and the rear wheel set, and heights between the front wheel set, the middle wheel set, the rear wheel set and the horizontal plane respectively, and the controller is used to receive the positions and the velocities of the front wheel set, the middle wheel set and/or the rear wheel set and the heights between the front wheel set, the middle wheel set and the rear wheel set and the horizontal plane which is transmitted by the sensor to separately control the steering directions of the front wheel set, the middle wheel set, the rear wheel set, and the suspension heights of the front wheel suspension assembly, the middle wheel suspension assembly and/or the rear wheel suspension assembly.

15. The six-wheel bionic chassis of claim 9, wherein when the sensor senses that the front wheel set encounters a vertical obstacle, the controller sends a signal to control the front wheel hub motor to operate at a first peak torque, so the front wheel set is subjected to the resultant force of a reaction force and a friction force acted on the vertical obstacle to compress the front wheel suspension spring assembly, so as to the front wheel suspension assembly drives the front wheel set to move upward away from the horizontal plane, so the front wheel set crosses the vertical obstacle, when the sensor senses that the middle wheel set encounters the vertical obstacle, the controller sends a signal to control the middle wheel hub motor to operate at a second peak torque, so the middle wheel set is subjected to the resultant force of a reaction force and a friction force acted on the vertical obstacle to compress the middle wheel suspension spring assembly, so as to the middle wheel suspension assembly drives the middle wheel set to move upward away from the horizontal plane, so the middle wheel set crosses the vertical obstacle, and when the sensor senses that the rear wheel set encounters the vertical obstacle, the controller sends a signal to control the rear wheel hub motor to operate at the second peak torque and the front wheel hub motor acts at the first peak torque, so the rear wheel set is subjected to the resultant force of a reaction force and a friction force acted on the vertical obstacle to compress the rear wheel suspension spring assembly, so as the rear wheel suspension assembly drives the rear wheel set to move upward away from the horizontal plane, so the rear wheel set crosses the vertical obstacle.

16. The six-wheel bionic chassis of claim 15, wherein the first peak torque is 13 N·m and the second peak torque is 10 N·m.

17. The six-wheel bionic chassis of claim 9, wherein the sensor is used to monitor the coordinate positions of the front wheel steering mechanism, the middle wheel steering mechanism, the rear wheel steering mechanism, the front wheel suspension assembly, the middle wheel suspension assembly and/or the rear wheel suspension assembly.

* * * * *